Nov. 30 1943.  R. L. MULLER  2,335,438
CARRIAGE DECELERATING MEANS FOR BUSINESS MACHINES
Filed Dec. 30, 1941  10 Sheets-Sheet 1

INVENTOR.
Robert L. Muller
BY Davis, Lindsey, Smith & Shonts
ATTORNEYS

Nov. 30 1943.       R. L. MULLER       2,335,438
CARRIAGE DECELERATING MEANS FOR BUSINESS MACHINES
Filed Dec. 30, 1941       10 Sheets-Sheet 2
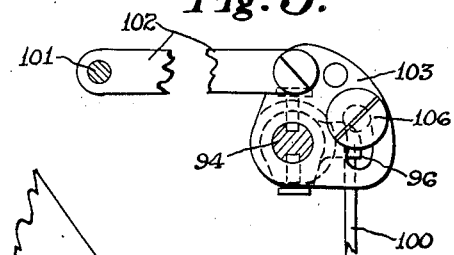
Fig. 3.
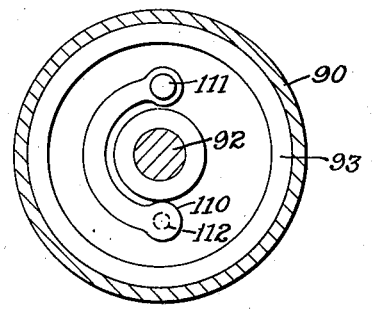
Fig. 2ª
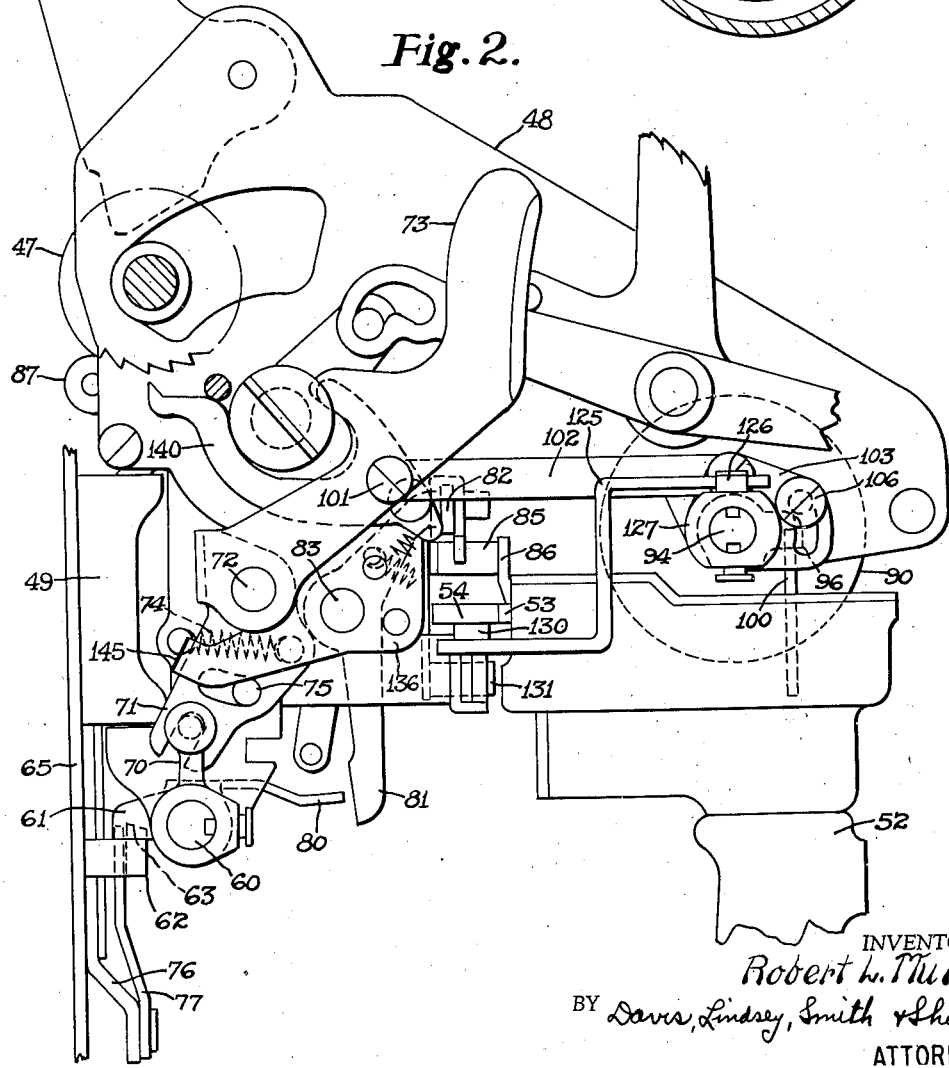
Fig. 2.
INVENTOR.
Robert L. Muller
BY Davis, Lindsey, Smith & Shonts
ATTORNEYS

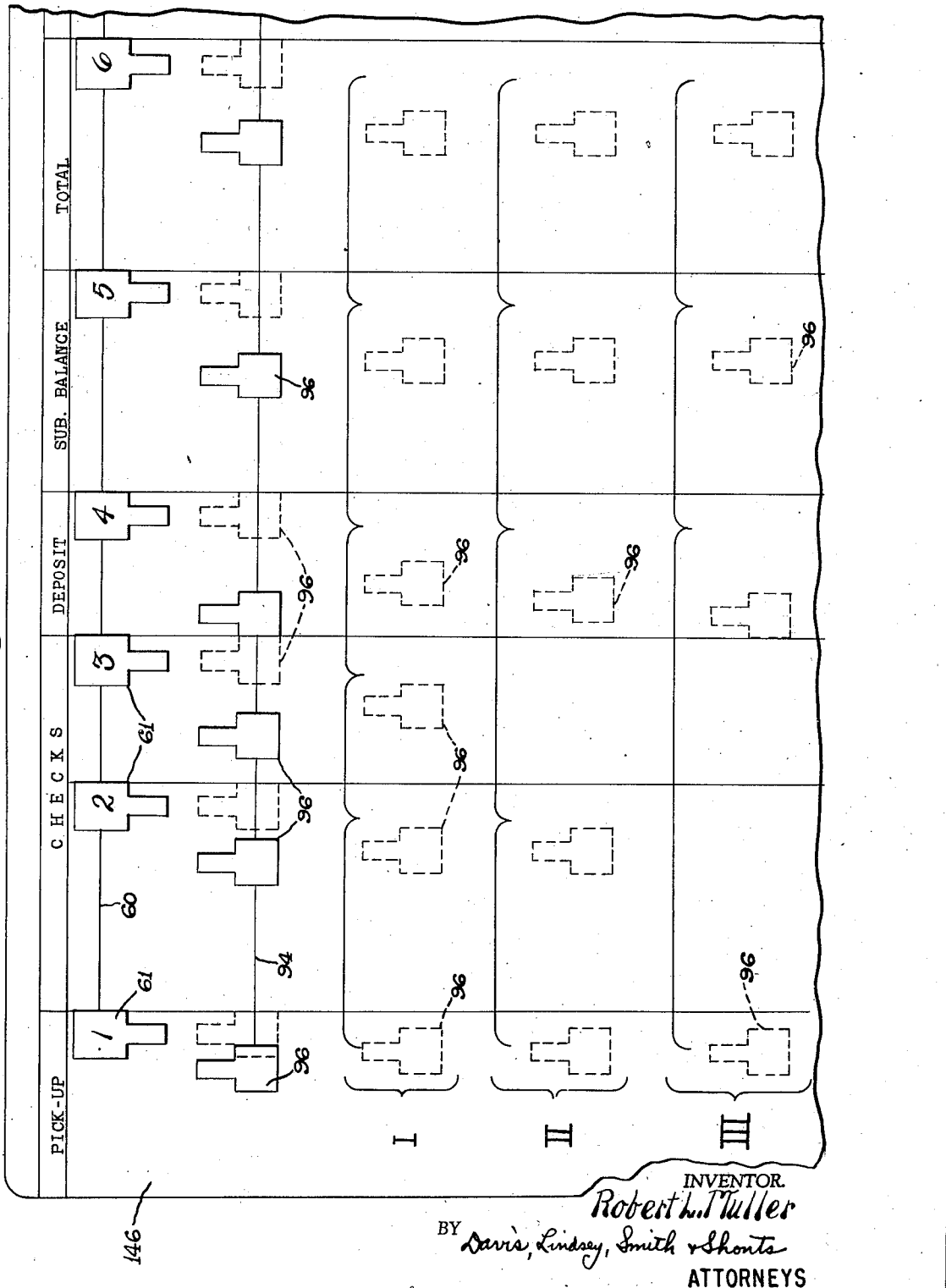

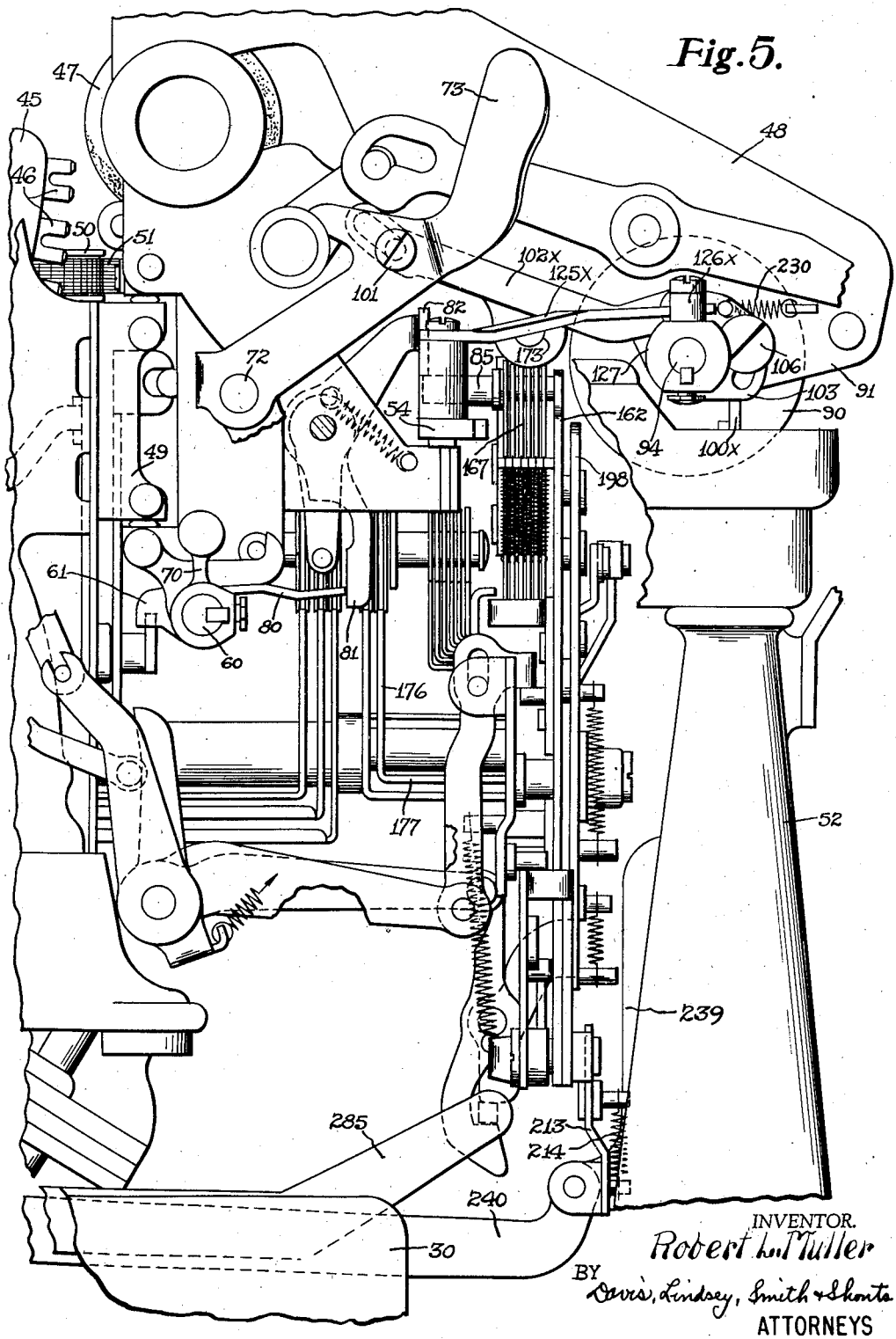

Nov. 30 1943.  R. L. MULLER  2,335,438
CARRIAGE DECELERATING MEANS FOR BUSINESS MACHINES
Filed Dec. 30, 1941  10 Sheets-Sheet 6
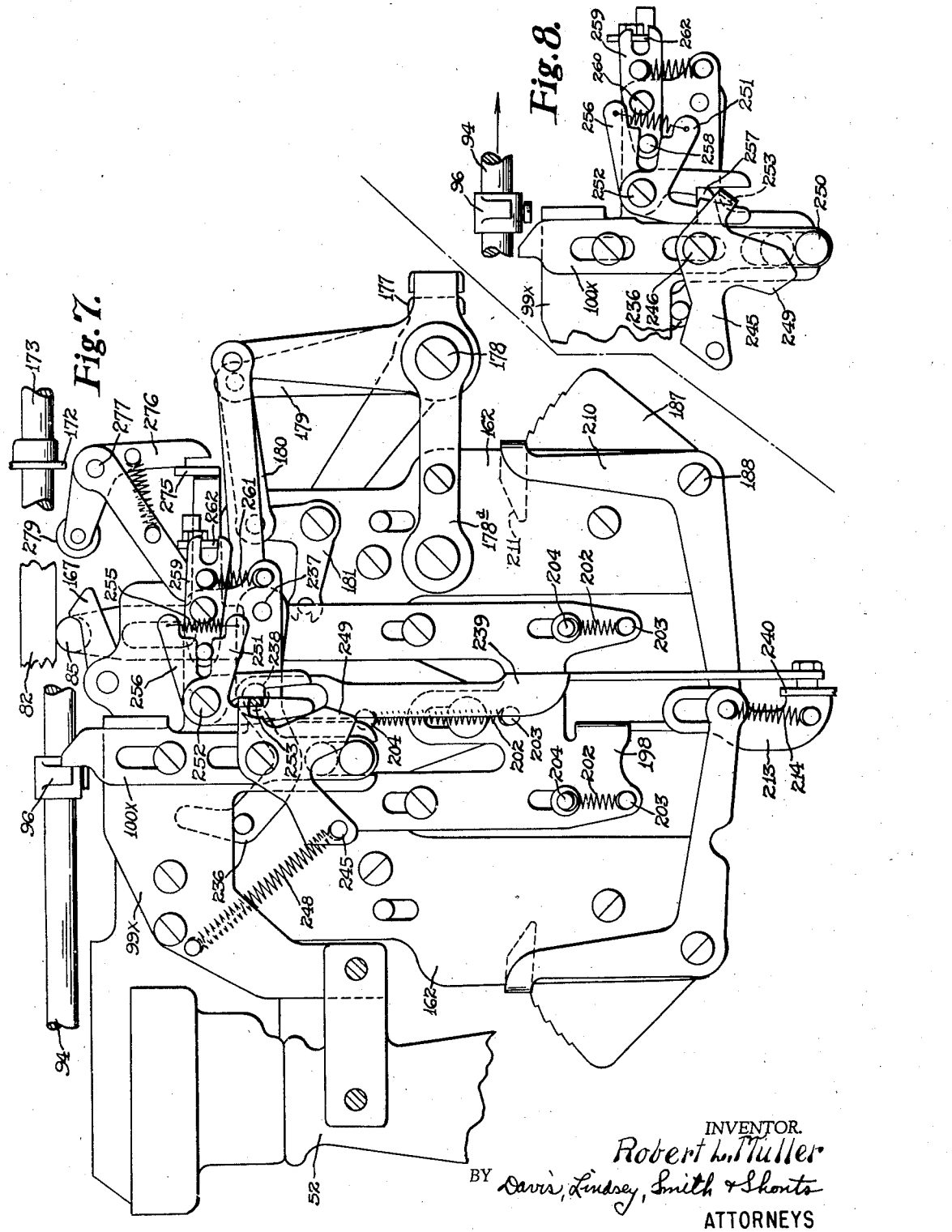
INVENTOR.
Robert L. Muller
BY Davis, Lindsey, Smith & Shonts
ATTORNEYS Nov. 30 1943.  R. L. MULLER  2,335,438
CARRIAGE DECELERATING MEANS FOR BUSINESS MACHINES
Filed Dec. 30, 1941  10 Sheets-Sheet 7
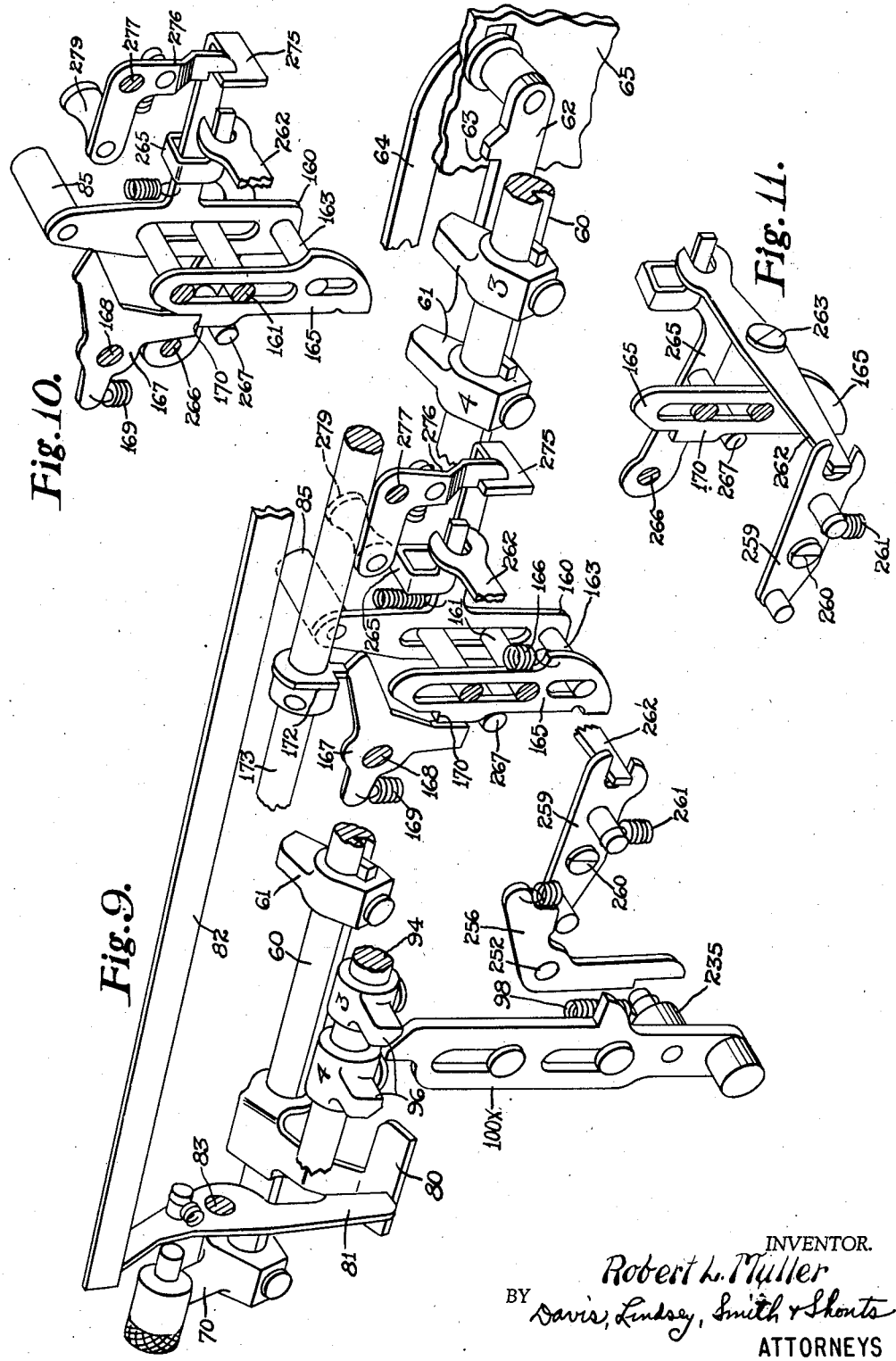
INVENTOR.
Robert L. Muller
BY Davis, Lindsey, Smith & Shonts
ATTORNEYS

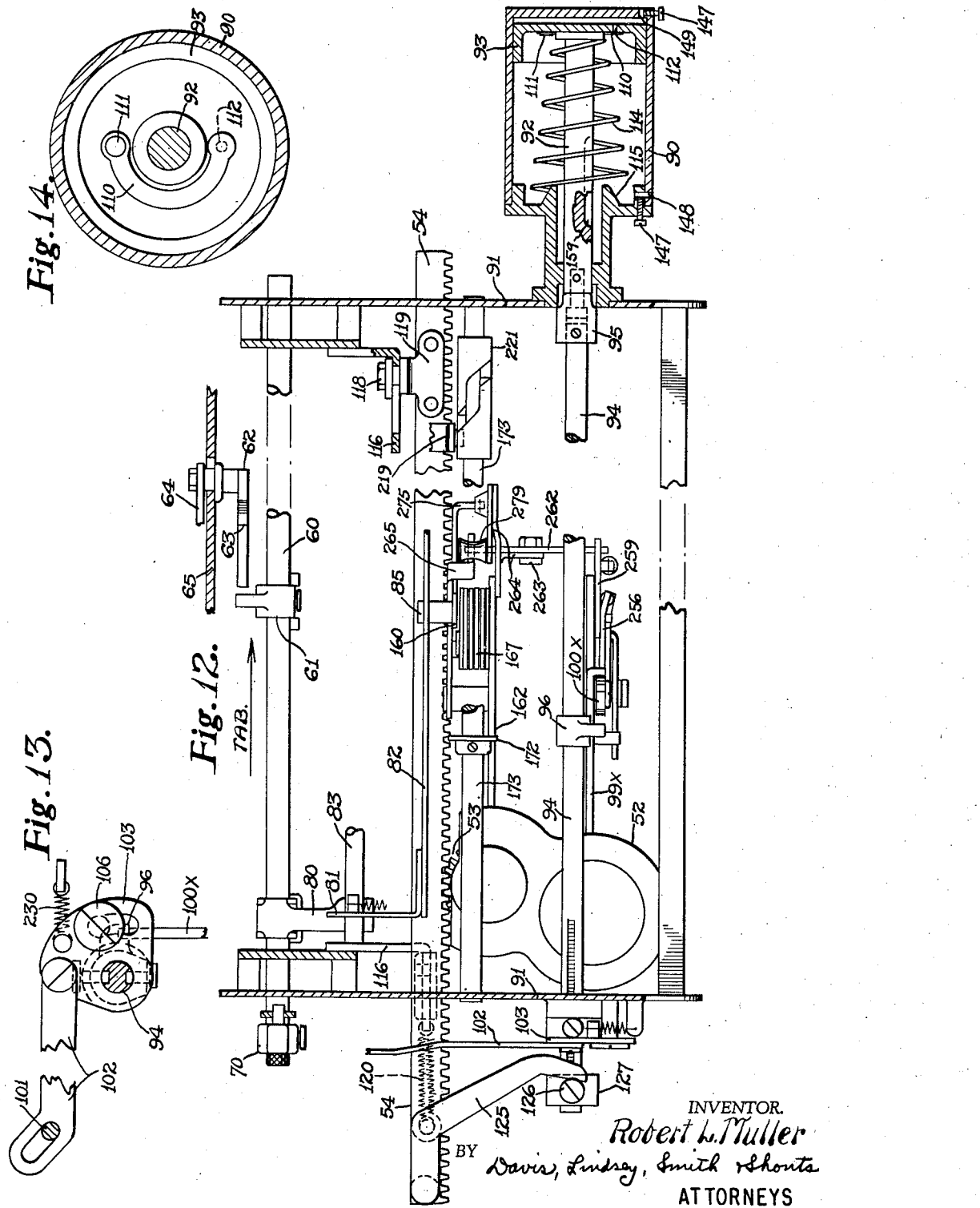

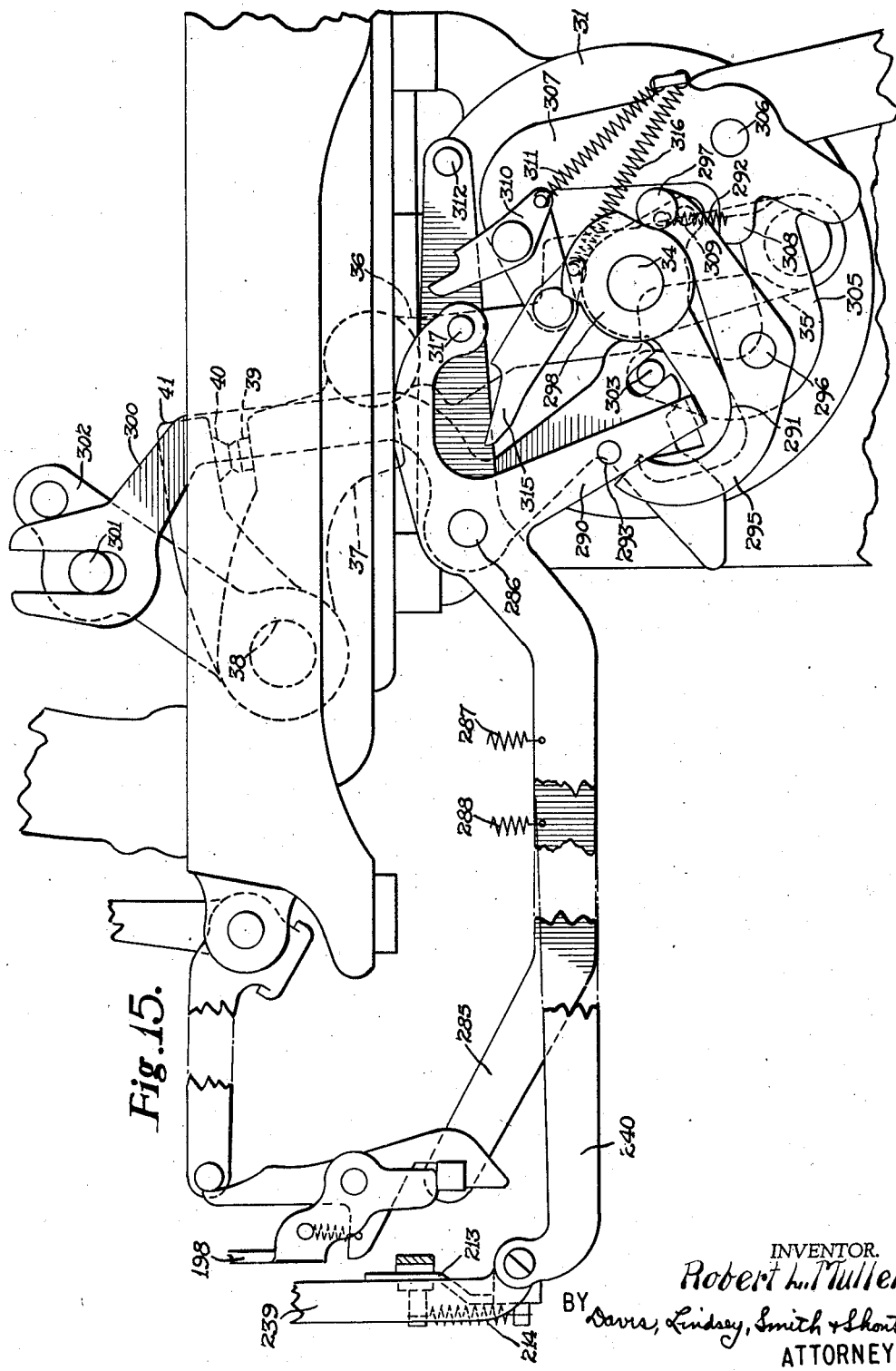

Nov. 30 1943.   R. L. MULLER   2,335,438
CARRIAGE DECELERATING MEANS FOR BUSINESS MACHINES
Filed Dec. 30, 1941   10 Sheets-Sheet 10
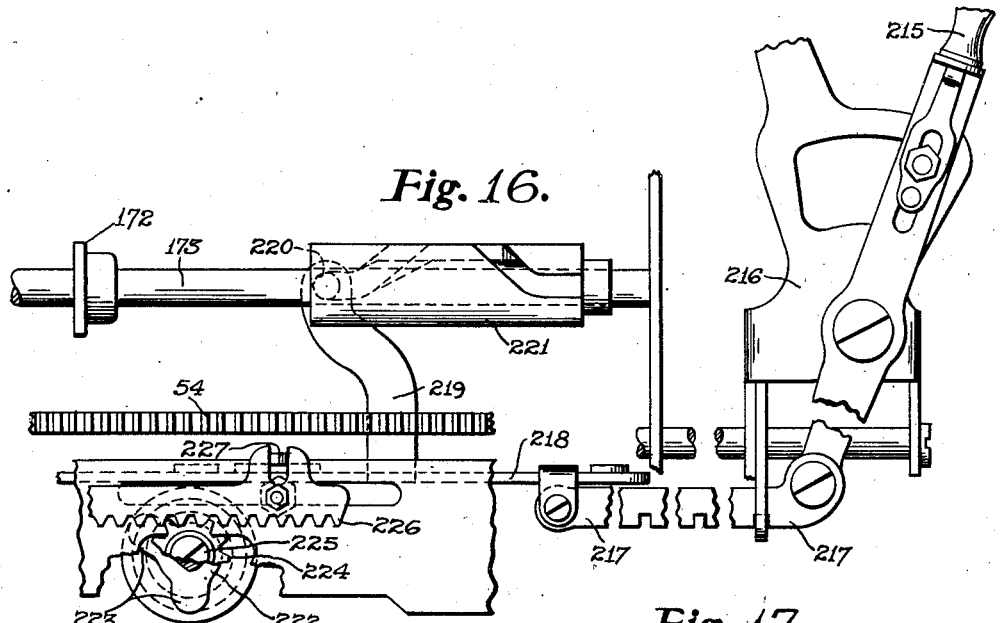
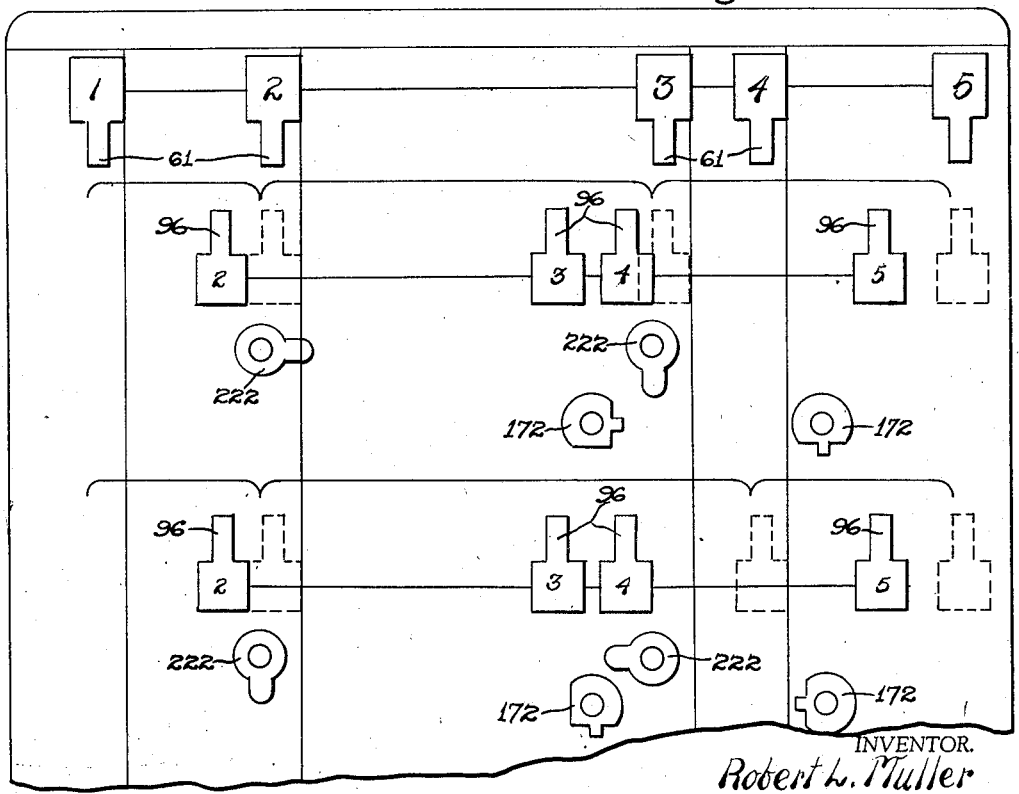

Patented Nov. 30, 1943

2,335,438

UNITED STATES PATENT OFFICE 2,335,438

CARRIAGE DECELERATING MEANS FOR BUSINESS MACHINES

Robert L. Muller, Detroit, Mich., assignor to Burroughs Adding Machine Company, Detroit, Mich., a corporation of Michigan Application December 30, 1941, Serial No. 424,970

12 Claims. (Cl. 197—177)

This invention relates to improvements in business machines having traveling carriages mounted for movement relative to a stationary supporting portion of the machine, and has to do more particularly with means for cushioning the carriage as it is arrested in its different positions on the stationary support portion of the machine, that is, means for decelerating the carriage rapidly but smoothly instead of abruptly as it nears the position where it is to be brought to rest.

One machine of the class to which the invention is applicable is the well-known Burroughs "high keyboard" calculating machine, which has a traveling paper carriage in which work sheets, such as statement forms, ledger forms and the like are inserted, and which is tabulated from columnar position to columnar position transversely of the stationary machine frame to permit the printing mechanism of the machine to record the items entered into the machine and totals and subtotals drawn from the machine in various columns of the work sheets. Though the traveling carriage of such a machine is of considerable weight, it is desirable to effect the movements of the carriage from columnar position to columnar position with sufficient rapidity that no unnecessary delay between successive cycles of operation of the machine will be caused by any avoidable delay in the arrival of the paper carriage in the proper columnar positions. Therefore, a considerable force is required for effecting such movements of the carriage, and the carriage is accelerated throughout substantially the whole of each tabulating movement from columnar position to columnar position, even when the distance from one columnar position to the next is large.

The distance between successive columnar positions of the carriage for any particular work form or set of forms usually varies considerably from column to column and many kinds of work require so-called skip-tabulating movements of the carriage directly from one columnar position to a subsequent columnar position through one or more intervening columnar position without arrest of the carriage in such intervening columnar positions. Therefore, the final velocity and momentum of the carriage as it arrives at its different columnar positions varies greatly from one columnar position to another, and also the final velocity and momentum of the carriage as it arrives in a given columnar position will be very much greater when the carriage skip-tabulates into said columnar position from a non-adjacent preceding columnar position than when the carriage arrives in said given columnar position by a regular tabulation from the adjacent preceding columnar position.

Stopping the carriage abruptly in its different columnar positions without preliminarily decelerating it or cushioning its arrest in any way would result in considerable noise and in considerable shock to the carriage and parts carried thereon and to other parts of the machine. Prior machines of this type have, therefore, been provided with a cushioning device interposed between the abutment which is engaged by the columnar tabulating stops on the carriage to arrest the carriage in its several columnar positions and the stationary portion of the machine on which said abutment is mounted in order to reduce noise and shock produced in the arrest of the carriage in its several columnar positions. Such cushioning devices heretofore have been so constructed and arranged as to provide substantially constant cushioning effect each time the carriage is arrested, regardless of the momentum of the carriage and the length of the successive carriage movements, and the cushioning effect has been sufficient to cushion the arrest of the carriage to the desired degree when it approached a columnar position with only a minimum of momentum as in a short tabulating movement but has been inadequate to prevent noise and shock to the carriage and other parts of the machine when the carriage is arrested in a columnar position toward which it moved with great momentum as in a long tabulating or skip-tabulating movement. The cushioning effect had to be kept small enough to prevent undue delay in the final arrival of the carriage in the proper columnar position at the end of a short tabulating movement before initiating a succeeding machine cycle.

Also, when a cushioning device of the air cushion dashpot type is adjusted for properly cushioning the carriage at the end of a short movement in which the carriage gains but little momentum, the cushioning device is likely to cause a rebounding of the carriage when the carriage is stopped at the end of a long tabulating movement in which it acquires high velocity and momentum.

It has been proposed to regulate the speed of the carriage in its tabulating movements by means of a speed governing device in order to prevent the velocity of the carriage from exceeding a predetermined value so as to permit of the cushioning device being adjusted to cushion the arrest of the carriage adequately after both long and short tabulating movements, but that is disadvantageous because it slows up the movement of the carriage and considerably reduces the work output of the machine for any given period of time.

It has also been proposed to automatically variably control the vent or vents of an air cushion dashpot in such manner as to provide a greater cushioning effect upon arrest of the carriage at the end of a long movement in which it gains a larger momentum than at the end of a short movement in which it acquires but little momentum. That, however, is not satisfactory because it has not been found possible to obtain consistently uniform results in the operation of air cushion dashpots with variably controlled vents.

It is an object of the invention to provide a machine of the stated character with a means which will adequately decelerate the traveling carriage as the latter approaches the position where it is to be arrested at the end of each movement thereof so that the arrest of the carriage in the required position will be effected always quietly and without shock to any of the machine parts regardless of whether the carriage nears such position with high momentum or with little momentum.

It is a further object of the invention to provide such a machine with a carriage decelerating device which will produce the above-proposed result without requiring the use of a governor or other speed limiting means which would lengthen the time required by the carriage movements and thus appreciably decrease the work output of the machine.

It is a further object of the invention to provide a machine of the class specified with a carriage decelerating means which will effectively cushion the arrest of the carriage regardless of variation of the momentum of the carriage throughout a very wide range so as to permit of more rapid acceleration and higher speeds of travel of the carriage, especially in long carriage movements, than have heretofore been practical, so that the work output of the machine may, therefore, be increased without causing objectionable noise and undesirable shock to the machine parts.

Machines of the class for which the invention is primarily intended are generally provided with power-driven means for returning the carriage across the machine each time it has completed a required program columnar tabulation. It is desirable to drive the carriage through its return movement as rapidly as possible, but it is also desirable to avoid shock to the carriage and parts carried thereby as well as to the carriage return mechanism. A further object of the invention is to provide such a construction and arrangement of the carriage decelerating means as will permit rapid carriage return movement to be initiated without unnecessary noise or shock.

In machines of the above-stated character, the platen supported in the carriage is usually rotated, for line spacing the work sheets, by means actuated by the carriage return means incidentally to the operation of the latter to return the carriage. It is a further object of the invention to so arrange the carriage decelerating means as to prevent undesirable shock to the line spacing means or unintended excessive rotation of the platen and spacing of the work sheets as power is applied to the carriage return means.

Further objects and advantages of the invention will be referred to hereinafter. Two embodiments of the invention are illustrated in the accompanying drawings, in which Figure 1 is a perspective view of portions of the traveling carriage of a machine to which one embodiment of the invention is applied;

Fig. 2 is a side elevation of the carriage and certain portions of the machine from the right of said carriage;

Fig. 3 is a detail view of certain parts shown in Fig. 2;

Fig. 4 is a diagrammatic illustration of the operation of the embodiment of the invention illustrated in Figs. 1 to 3;

Fig. 5 is a right-side elevation of the paper carriage and certain portions of the machine more particularly related to a modified form of the invention;

Fig. 7 is a rear elevation of the control mechanism of Fig. 6 showing additional parts of the modified embodiment of the invention;

Fig. 8 is a detail view of a portion of Fig. 7;

Figs. 9, 10 and 11 are perspective views of portions of the modified form of the present invention;

Fig. 12 is a plan view of portions of the paper carriage of Fig. 5 showing portions of the modified form of the present invention associated therewith;

Fig. 13 is a detail view of a portion of Fig. 5;

Fig. 14 is a detail view of a portion of the carriage decelerating means;

Fig. 15 is a left-side elevation of a portion of the machine showing more particularly the power-actuated means for operating the mechanism controlling the movements of the carriage and the operation of the carriage decelerating means;

Fig. 16 is a rear elevation of portions of the means for readily changing programs of carriage movement; and Fig. 17 schematically illustrates the operation of the modified form of the invention of Figs. 5 to 16.

Figure 1:
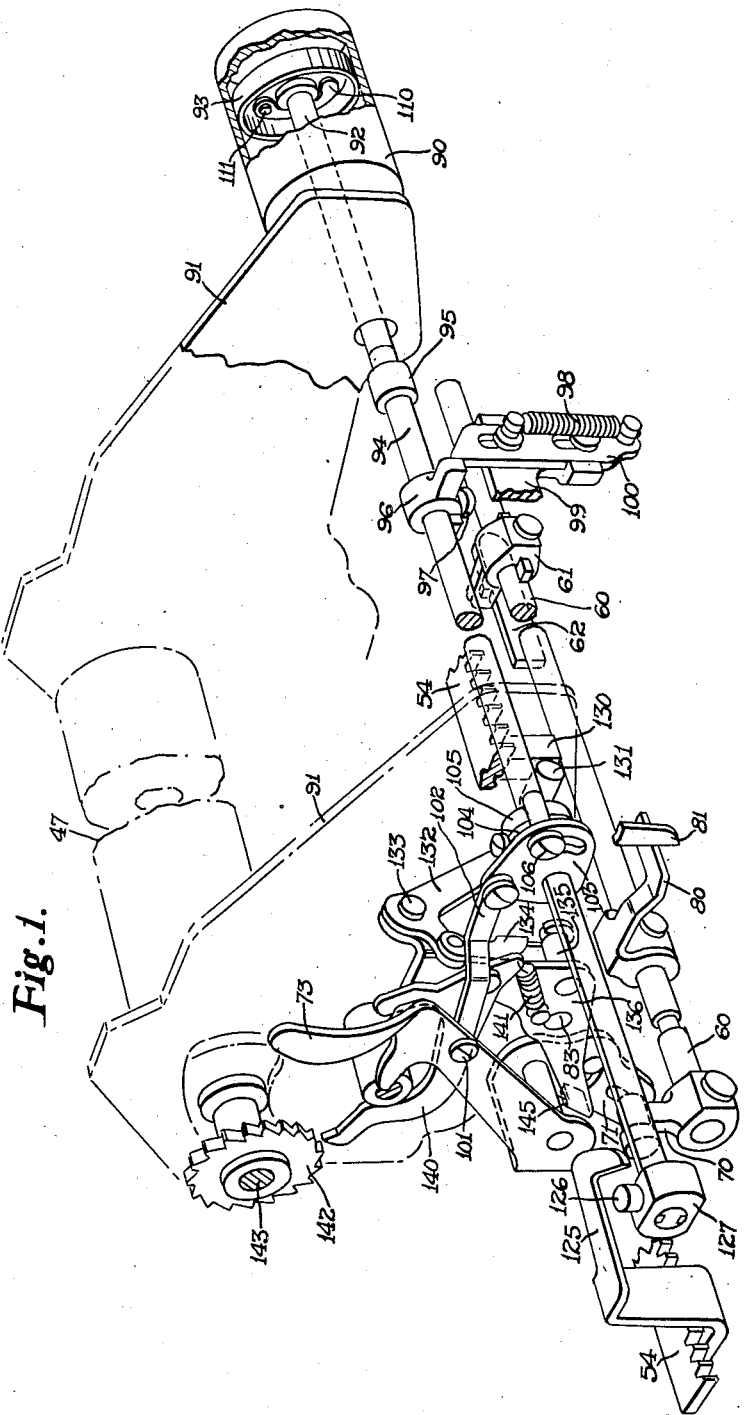

The invention is illustrated as applied to Burroughs "high keyboard" calculating machines, but may also be applied to various other machines with traveling carriages. The general construction and operation of the Burroughs "high keyboard" machines are disclosed in many prior patents and well known and will not be described in detail hereinafter except with reference to those portions of the machine which directly cooperate with the new means provided by the present invention.

General construction of machines

The machines illustrated in connection with the two embodiments of the invention disclosed herein are of the same general construction except as hereinafter more particularly described. Each may be manually driven but is preferably driven by an electric drive mechanism which may be generally like that disclosed in Bindschedler Patent No. 1,658,036 and comprises an electric motor 30 (Fig. 5) and a single revolution clutch mechanism enclosed in the housing 31 (Fig. 15), the motor circuit and clutch being controlled by one or more motor bars or keys (not shown), some of which may also serve to condition mechanisms of the machine for predetermined functions. In each cycle of operation of the machine the crank 35 driven through the clutch 31 receives a single complete revolution and, through the link 36, rocks the arm 37 first counterclockwise (in Fig. 15) about the shaft 38 and then clockwise back to its normal position of Fig. 15. The arm 37 carries an abutment 39 which cooperates with an abutment 40 on an arm 41 fixed on the shaft 38 to positively drive the latter arm and shaft counterclockwise (in Fig. 15) in the forward stroke of the machine cycle after which the arm 41 and shaft 38 are returned clockwise by springs (not shown) and under regulation by the usual dashpot (not shown) during the return stroke of the machine cycle as permitted by the return of the arm 37 to its normal position.

The machine has a printing mechanism which may be generally like that disclosed in United States Burroughs Patent No. 505,078 with improvements disclosed in one or more later patents such as Gooch 825,205, Gascon 1,395,991, Putnam 1,018,371 and my prior Patent No. 1,843,648. The printing mechanism includes a series of type carrying sectors 45 (Fig. 5) which, during the forward stroke of each cycle of operation of the machine, are positioned in accordance with the amount set up on the usual keyboard (not shown) or the total or subtotal drawn from one of a number of registering mechanisms (not shown) which may, for example, be constructed and operated in the manner disclosed in Pasinski Patent No. 1,911,768. At the end of the forward stroke of the cycle the type 46 positioned along the printing line of the platen are driven toward the platen 47 by the usual printing hammers (not shown). The platen 47 is rotatably mounted in a paper carriage indicated generally by the reference number 48 and mounted for movement transversely across the back of the machine on a raceway 49.

The carriage 48 is moved from column to column in the tabulating direction by the usual spring enclosed in a drum 50 on which is wound a tape 51 connected at its free end with the carriage. The tabulating movements of the carriage are controlled by a tabulating mechanism which may be like that disclosed in Rinsche Patent No. 1,580,534 and portions of which will be described hereinafter. The carriage is returned in the opposite direction by a motor-driven carriage return means generally like that disclosed in said Rinsche Patent No. 1,580,534 and driven by the motor 30 through drive contained in the housing 52. The carriage return means includes a clutch which is also contained in the upper portion of the housing 52 and through which said drive connections may be coupled with a gear 53 (Fig. 6) meshing with a rack 54 (Figs. 2 and 12) on the carriage.

The tabulating mechanism comprises a column stop shaft 60 (Figs. 2, 5, 9 and 12) rockably supported in the carriage but prevented from moving axially relative to the carriage. A suitable number of column stops 61 are mounted on the column stop shaft and may be adjusted to any desired positions along the length of said shaft 60 and secured in such adjusted positions. The several column stops 61 are adapted to hold the carriage in the respective columnar positions by engagement with a tabulating abutment 62 (Figs. 9 and 12) mounted on the back plate 65 of the machine for a short horizontal sliding movement. The tabulating abutment 62 is connected to one end of a link 64 which is spring-urged to the left as viewed from the rear of the machine and by which it is connected, as disclosed in my prior Patent No. 2,012,317, with an interlock device by which the cycle of machine operation is prevented from being initiated except when the carriage has come to rest in a proper columnar position with a column tab stop 61 engaging the tabulating abutment 62 and holding the latter to the right as viewed from the rear of the machine.

A crank arm 70 (Fig. 2) secured on the left end of the column stop shaft 60, viewing the machine from the rear, carries a crank pin engaged in a slot in the lower end of a manually tabulating lever 71 which is pivoted on a stud 72 secured in the carriage frame and has on its upper end a finger grip portion 73 which the operator may pull forwardly to rock the column stop shaft 60 clockwise to raise the forward projections of the column stops 61 above the level of the tabulating abutment 62. The column stop shaft 60 is normally urged counterclockwise to the position of Fig. 2, where the forward projections on the column stops 61 are in horizontal alignment with a shoulder 63 on the tabulating abutment 62, by a tension spring 74 connected at one end to a stud on the carriage frame and at its other end to a stud secured in the manually tabulating lever below the pivot stud 72, the throw of the manually tabulating lever being limited by a stud 75 fixed in the carriage frame and engaged in a slot in the lower portion of said manual tabulating lever 71.

During each cycle of operation of the machine a slide 76 vertically slidably mounted on the back plate 65 of the machine is moved downward in the forward stroke of the machine cycle to permit the upper end of a spring-urged tabulating pawl 77 pivotally mounted at its lower end on the lower end of the slide 76 to move under the forward projection of the column stop 61 currently engaged against the tabulating abutment 62. During the return stroke of the cycle the slide 76 is returned upwardly to normal position together with the tabulating pawl 77 which, during the initial portion of such upward movement, rocks the column stop 61 and stop shaft 60 to disengage the active column stop from the shoulder 63 of the tabulating abutment, and the carriage is thereby released for tabulating movement and the tabulating abutment permitted to be moved leftward, as viewed from the rear of the machine, by the spring-urged link 64. A short movement of the carriage in the tabulating direction removes the forward projection of the active column stop 61 from the upper end of the tabulating pawl 77, whereupon the column stop shaft 60 is returned counterclockwise to normal position by the spring 74 to place the next column stop 61 in position to engage the shoulder 63 on the tabulating abutment as the carriage moves to the next columnar position. As the carriage approaches such next columnar position, the next column stop 61 engages against the side edge of the upper end of the tabulating pawl 77 and rocks the same in the direction of the tabulating movement of the carriage until the latter column stop engages the shoulder on the tabulating abutment 62 and returns the latter to the right in Fig. 12 to its normal position and arrests the carriage.

The machine is provided with means for effecting skip tabulation by delaying the return of the column stop shaft 60 and column stops 61 carried thereby counterclockwise to normal position during the tabulating movement of the carriage until after column stops for the columns to be skipped have passed over the shoulder 63 of the tabulating abutment. This means includes a lever 80 (Figs. 1, 2, 5, 9 and 12) secured on the column stop shaft 60 and adapted to cooperate at its rear end with a latch arm 81 extending from one side arm of a skip tab control bail 82 pivoted on studs 83 supported in the carriage frame. The cross member of the bail 82 cooperates with a roller stud 85 on a skip tabulation control slide 86 which may be controlled as disclosed in Rinsche Patent No. 1,580,534.

The carriage 48 may be constructed as disclosed in my prior Patents Nos. 2,202,595 and 2,202,596 and the machine may be provided with means such as disclosed in said prior patents for automatically rocking the platen 47 out of printing position and opening the paper throat between the platen and the feed rolls 87 to facilitate the insertion of papers around the platen at appropriate times.

Carriages of machines of the class to which the invention relates are generally of considerable weight but, nevertheless, must be moved rapidly from each columnar position to the next so as not to cause any unnecessary delays between successive machine cycles. Such machines are frequently conditioned for different functions when the carriage is in its different columnar positions automatically under the control of the carriage. The carriage, of course, must be positioned in the proper columnar position before each machine cycle is initiated, not merely to secure proper columnar alignment of the data printed by the machine, but also to insure the proper operation of the automatic function control devices of the machine. The weight of the carriage and the speed with which it must be moved in order to secure maximum work output from the machine creates a problem in properly cushioning the carriage so as to avoid shock to the machine parts and unnecessary noise as the carriage is arrested in its several columnar positions.

Heretofore, the link 64 connected to the tabulating abutment 62 has been connected with an air-cushion dashpot to decelerate the carriage as a column stop engages the tabulating abutment 62 and returns the latter to its normal position where it finally arrests the carriage.

In the prior machines the reciprocating stroke of the tabulating abutment 62 and also of the air-cushion dashpot connected therewith through the link 64 has been substantially constant for each tabulating movement of the carriage, regardless of the length of the tabulating movement and regardless of the speed to which the carriage accelerated in such movement to any of its columnar positions. The air-cushion dashpot was normally arranged or adjusted to permit the carriage to settle promptly into the correct columnar position without objectionable delay after engagement of a column stop with the tabulating abutment in the shorter tabulating movements of the carriage, but failed to provide adequate cushioning or deceleration of the carriage in the final portions of the long tabulating or skip tabulating movements during which the carriage accelerated to higher speeds. Also, when the air-cushion dashpot was properly adjusted for tabulating movements in which the carriage reached only a relatively low velocity, the air-cushion dashpot would sometimes have a tendency to cause recoil of the carriage when compressed very rapidly in the final portion of a carriage tabulating movement in which the carriage reached a high velocity. Such rebounding of the carriage, if not prevented, would also cause delay between machine cycles.

As already mentioned, it was not desired to provide a governor to prevent the carriage, in its tabulating movement, from exceeding a predetermined maximum speed at which the air-cushion dashpot would decelerate the carriage in the final portion of each tabulating movement sufficiently to permit the final arrest of the carriage to be effected with the desired minimum of shock and noise, regardless of the length of the tabulating movement of the carriage. The limited speed of the carriage would cause undesirable delays between successive machines cycles and thus reduce the work output of the machine. Attempts to regulate the cushioning effect of constant stroke air-cushion dashpots in accordance with the lengths of the successive tabulating movements of the carriage, and thus in accordance with the velocities with which the carriage arrived in its successive columnar positions, have not been satisfactory because of the difficulties of obtaining accurate control of the variation of cushioning effect of the dashpot in that manner.

*Carriage decelerating means*

The prior constant stroke air-cushion dashpot is not used in the present invention and, though in the specific forms of the invention herein described and illustrated the lateral sliding movement of the tabulating abutment is not utilized for the purpose of decelerating the carriage in the final portions of its tabulating movements, the abutment 62 is still mounted and arranged for a short lateral sliding movement sufficient for the purpose of operating the usual interlock (not shown) which prevents initiation of a machine cycle while the carriage is not accurately positioned in a proper columnar position. In both forms of the invention illustrated in the accompanying drawings, the cylinder 90 (Figs. 1 and 12) of an air-cushion dashpot is secured to one of the end plates 91 of the carriage frame. The piston rod 92 of the piston 93 working within the cylinder 90 is secured at its outer end to a shaft 94 through a coupling 95, permitting rotation of the shaft 94 relative to the piston rod 92. The other end of the shaft 94 is slidably and rotatably supported in the opposite end plate 91 of the carriage frame. The shaft 94 carries a number of stop members 96 essentially similar to the column stops 61, said stops 96 being keyed to the shaft 94 against rotation relative thereto. The stops 96 may be adjusted to any desired positions axially along the shaft 94 and secured in such adjusted positions by means of set screws 97 (Fig. 1).

The upper end of a slide 100 mounted for vertical movement on a plate 99 secured to a portion of the carriage return drive casing provides at the upper end of one of its side edges an abutment face to cooperate with the rearwardly extending projections of the stops 96, and the upper edge of said slide 100 is beveled downwardly from said abutment face toward the other side edge of the slide to permit the rearward projections of the stops 96 to ride over the upper end of the slide and cam the slide 100 downward against the tension of a spring 98 connected between a stud on said slide and a stud on the plate 99 when the carriage is moved in the return direction manually without pulling the lever 73 forwardly to lift the projections of the stops 61 and 96 clear of the abutments 62 and 100. The stop 96 for each columnar position of the carriage is secured on the shaft 94 in such a position that, as the carriage moves in a tabulating direction toward the respective columnar position, the stop 96 will engage the abutment face of the slide 100, when the carriage reaches a point in its travel which is sufficiently ahead of the columnar position where it is to be arrested by the corresponding column stop 61 and tabulating abutment 62 to cause the stop 96, the shaft 94, the piston rod 92 and piston 93 to be arrested while the carriage and dashpot cylinder 90 continue through the final portion of the tabulating movement to thereby decelerate the carriage sufficiently in such final portion of the tabulating movement so that the ultimate arrest of the carriage by the column stop 61 and tabulating abutment 62 will be accomplished without undesirable shock and noise.

When the carriage is at rest in a columnar position with a column stop 61 engaged against the shoulder 63 on the tabulating abutment and the corresponding decelerator stop 96 engaged against the abutment face of the decelerator abutment slide 100, it is, of course, necessary, in order to tabulate or skip tabulate the carriage to a succeeding columnar position, to disengage the engaged decelerator stop 96 from the decelerator abutment 100 as well as to disengage the engaged column stop 61 from the shoulder 63 of the tabulating abutment. The manner of disengaging the engaged column stop 61 from the tabulating abutment 62 to tabulate the carriage has previously been described and results in the clockwise rocking of the column stop shaft 60 as well as the clockwise rocking of the manual tabulating lever 71, 73 in Fig. 2. The latter, in the embodiment of the invention shown in Figs. 1 to 4, carries a stud 101 by which it is pivotally connected with the forward end of a link 102 which is pivotally connected at its rear end to a plate 103 secured on a collar 104 which is axially slidably but non-rotatably secured on the shaft 94 and rotatably but axially non-slidably secured on a bearing sleeve 105 which is fixed in the carriage end plate 91 and provides a bearing for the shaft 94. A stud 106 passing through a slot in the plate 103 and secured in the carriage end plate 91 limits the throw of the rocking movement of the plate 103 and decelerator stop shaft 94.

Through the connections above described, the decelerator stop shaft 94 is rocked counterclockwise to lift the rearward projection of the engaged decelerator stop 96 out of engagement with the decelerator abutment 100 as the column stop shaft 60 is rocked clockwise to disengage the active column stop 61 from the shoulder of the tabulating abutment 62 to cause tabulation of the carriage. When the tabulating movement of the carriage disengages said column stop 61 from the tabulating pawl 77 and permits the column stop shaft 60 to be returned counterclockwise to normal by the spring 74, the latter spring acting through the lever 71, 73, returns the link 102, plate 103 and decelerator stop shaft 94 to normal position to place the rearward projection of the succeeding decelerator stop 96 in alignment with the decelerator abutment 100.

It will be apparent that, if the skip-tabulating control is active to cause the skip latch arm 81 to engage above the rear end of the arm 80 and hold the column stop shaft 60 in its rocked position with the column stops 61 out of alignment with the tabulating abutment 62 until after the column stops 61 for the columns to be skipped have passed the shoulder of the tabulating abutment 62, the decelerator stop shaft 94 will also thereby be held in its rocked position with the decelerator stops 96 out of alignment with the decelerator abutment 100 until after the decelerator stops 96 for the columns to be skipped have passed over the decelerator abutment 100. Such control of the decelerator stops in skip-tabulating movements of the carriage is adequate for all ordinary purposes where the length of the stroke of the air-cushion piston in decelerating the carriage at the end of any skip tabulating movement of the carriage into a given columnar position does not closely approach or exceed the spacing between the column stop 61 for such columnar position and the immediately preceding column stop 61. The problem which arises under such special circumstances and the solution thereof will be discussed later in connection with the modified embodiment of the invention hereinafter described.

The air cushion dashpot as used in the embodiment of the invention shown in Figs. 1–4 is the same as that shown in Figs. 12 and 14. The piston 93 is provided with a check valve comprising a flat spring plate 110 secured to the compression face of the piston at one end by a stud 111 and yieldingly seating at its other end against the compression face of the piston around a passage 112 extending through the piston. The piston 93 is normally urged to its fully retracted position by a compression spring 114 inserted between a shoulder on the piston end of the piston rod 92 and the opposed end wall of the cylinder 90 which, for the purpose of holding the end of the spring properly positioned, may be formed with an annular boss 115 through which the piston rod 92 passes. The dimensions and characteristics of the spring 114, the spring valve 110 and the passage 112 through the piston 93 could all be such as to permit of the return of the piston to its fully retracted position during the first part of each tabulating movement of the carriage after the previously engaged decelerator stop 96 has been disengaged from the abutment 100, so that the deceleration of the carriage in the final portion of each tabulating movement would be greater or smaller as the relative spacing of the corresponding decelerator stop 96 ahead of the corresponding column tabulating stop 61 is greater or smaller. Such an arrangement would serve to decelerate the carriage adequately in all regular tabulating movements. However, the most advantageous performance of many kinds of work requires the use of skip-tabulating movements of the carriage to avoid unnecessarily stopping the carriage in columnar positions where it is not necessary to operate the machine or to print any entries. Where skip-tabulating movements of the carriage are involved, the carriage will arrive in a given columnar position sometimes after a short tabulating movement with a certain velocity or momentum and arrive in the same columnar position at other times after a longer skip-tabulating movement with a greater velocity or momentum. The present invention provides for automatically varying the effect of the carriage decelerating means automatically, proportionately to the different velocities with which the carriage may, at different times, arrive in any given columnar position. For this purpose, the dimensions and characteristics of the spring 114 and the check valve 110 are made such that the dashpot piston is returned to its fully extended position at a speed within a range which is such, as compared with the speed of travel of the carriage, that the dashpot piston will not return as far toward its fully retracted position during a short tabulating movement of the carriage as during a long tabulating or skip-tabulating movement of the carriage. The effect of such operation of the carriage decelerating dashpot is illustrated in Fig. 4. However, before a full explanation of the movements of the decelerating stops illustrated in Fig. 4 is attempted, a further feature of the invention should be considered.

The carriage decelerating dashpot also serves for smoothly accelerating the carriage at the beginning of its return movement when the carriage return clutch is engaged. As previously mentioned, the driven member of the carriage return clutch is geared to the rack 54 mounted on the carriage. Secured on the right-hand and left-hand portions of the carriage frame (Fig. 12) are a pair of brackets 116 with portions which extend parallel to the direction of the carriage travel and formed with slots which receive headed studs 118 which are secured in brackets 119 fixed on the rack 54, whereby the rack 54 is permitted a substantial lengthwise movement relative to the carriage, though it is normally held at the right-hand limit of such movement, as viewed from the back of the machine, by a tension spring 120 connected between one bracket 116 and a stud 121 on the rack 54. At its left-hand end, as viewed from the rear of the machine, the rack 54 has secured thereon an arm 125 engaging against one side of a stud 126 carried by a collar 127 adjustably secured on the free end of the decelerator stop shaft 94.

Immediately preceding the closing of the carriage return clutch the motor is usually running down without load and with its power supply circuit open, but the motor circuit is immediately reclosed as the carriage return clutch is engaged. If the rack 54 were rigidly secured to the paper carriage, the return movement of the paper carriage would be started abruptly with considerable shock to the carriage and the carriage return drive connections, even though a constantly engaged friction coupling is inserted in the carriage return drive connections as disclosed in Rinsche Patent No. 1,580,534. However, when the carriage return clutch is engaged, the rack is first moved to the left, as viewed from the back of the machine, relative to the carriage for a substantial distance. During this movement of the rack relative to the carriage, the rear end of the arm 125 acts on the stud 126 to move the stop rod 94 and piston 93 to the left, as viewed from the back of the machine, relative to the carriage. The spring 114 and the difference in air pressures created on opposite sides of the piston 93 in the dashpot 90 by such movement of the stop rod 94 and piston relative to the carriage bring about a smooth acceleration of the carriage whereby the carriage return movement is initiated without undesirable shock to the carriage and the carriage return drive connections.

In the illustrated machine as in Rinsche Patent No. 1,580,534, the movement of the rack 54 relative to the carriage and against the tension of the spring 120 at the commencement of the carriage return movement is utilized for operating the line spacing mechanism to rotate the platen 47 so as to line space the work sheet thereon between the completion of one line of entries and the beginning of the next line of entries. For this purpose, the rack 54 carries a depending stud or block 130 (Fig. 1) which, during the movement of the rack 54 relative to the carriage at the beginning of the operation of the carriage return means, engages a stud 131 carried on one arm of a bell crank 132 pivoted on a stud 133 secured in the carriage frame. The other arm of the bell crank 132 has pivotally connected thereto a depending hook 134 which engages a stud 135 on a lever 136 pivoted on one of the studs 83. The line spacing pawl 140 is pivoted on the upper rear end of the lever 136 and connected at its rear end to one end of a spring 141 which is connected at its other end to a stud secured on the lever 136 and urges the line spacing pawl 140 clockwise, as viewed in Fig. 1, to engage its forward end with the line spacing ratchet wheel 142 which is secured on the platen shaft 143. Through the parts above described, the movement of the rack 54 against the tension of the spring 120 and relative to the carriage at the start of the carriage return operates the line spacing mechanism to line space the platen.

The lower forward end of the lever 136 has a lug 145 engaging in front of the forward edge of the lower arm 71 of the manual carriage tabulating lever whereby the movement of the rack 54 relative to the carriage at the start of the carriage return also rocks the column stop shaft 60 as well as the decelerator stop shaft 94 to lift the projections of the column stops 61 and decelerator stops 96 above the tabulating and decelerating abutment members 62 and 100 prior to and during the return of the carriage.

After the carriage return clutch is disconnected at the end of the carriage return movement, the spring 74, acting through the lever 71, 73, returns the stop shafts 60 and 94 and the line spacing mechanism to normal.

It will be appreciated that the length of the movement of the rack 54 relative to the carriage upon the engagement of the carriage return clutch is desirably constant and sufficient to effect the desired line spacing of the platen and lifting of the projections of the stops 61 and 94 above the abutments 62 and 100. This movement may be longer than the stroke of the dashpot piston 93 required for smoothly accelerating the carriage without shock at the start of the carriage return movement. The length of stroke of the piston 93 to be utilized for that purpose can be adjusted to suit requirements by adjustment of the stud 126 and collar 127 along the decelerating stop shaft 94 so that it will be engaged by the end of the arm 125 at the desired point in the movement of the rack 54 relative to the carriage.

Fig. 4 schematically illustrates the movements of the decelerator stops 96 relative to the column stops 61 in a construction in which the tabulating abutment 62 and the decelerator abutment 100 are aligned with each other in a vertical plane parallel to the sides of the machine and so aligned with the printing mechanism that, with the carriage at rest in any given columnar position, the end surfaces of the active column stop 61 and active decelerator stop 96 will both be aligned with the right-hand edge of the corresponding column on the work sheet 146. The column stops 61 have been diagrammatically illustrated superimposed on the work form 146 at the top thereof. Immediately below the column stops 61, the decelerator stops 96 have been illustrated in full lines in the positions in which they are secured on the decelerator stop shaft 94 and which they occupy relative to the column stops 61 with the piston 93 and stop shaft 94 in their fully retracted positions. On the same horizontal line, the position which each individual decelerator stop 96 occupies when the carriage has come to rest in the respective columnar position is indicated in dotted lines.

In the last three rows, I, II and III, across the form, the position of the decelerator stop 96 for each column relative to the carriage and the work sheet therein at the instant the decelerator stop 96 for such column engages the decelerator abutment 100 during the tabulating movement of the carriage into the respective column is indicated in dotted lines for three different series of tabulating movements of the carriage across the machine as required for three different transactions or lines of postings to be recorded on the work sheet. By comparing the positions of the decelerator stops 96 shown in line I with the fullline positions of said stops 96 illustrated immediately above line I, it will be seen that the decelerator piston 93 does not restore to its fully retracted position during the short movement of the carriage in the tabulating direction into the column 1 position following the release of the carriage return clutch. However, the position of the decelerator stop 96 for column 1 on the shaft 94 is such that the decelerator stop 96 engages the abutment 100 during the movement of the carriage toward the column 1 position at a point when the carriage is still sufficiently ahead of its column 1 position to produce a short compression stroke of the piston 93. Such a short stroke of the piston 93 will have little or no decelerating effect on the carriage but little or no deceleration is required after such a short movement of the carriage in the tabulating direction into its column 1 position. However, the piston 93 is thereby prevented from restoring to its fully retracted position, which is desirable for permitting of a maximum range of automatic variation of the decelerating effect in subsequent columnar positions.

The first transaction or line of postings requires, as shown in line I, that the carriage be stopped for printing in each columnar position. The movement of the carriage from the column 1 position to the column 2 position is longer than the short movement in the tabulating direction into column 1 and the carriage is accelerated to a greater velocity and requires some deceleration in the final portion of such movement. However, the decelerator piston 93 will be retracted somewhat by the spring 114 during this tabulating movement. Therefore, the decelerator stop 96 for column 2 will be secured on the stop shaft 94 in a position spaced from the decelerator stop 96 for column 1 by a distance equal to the sum of the distance between the column stops 61 for columns 1 and 2 and the distance through which the piston 93 and shaft 94 restore during the tabulation of the carriage from column 1 to column 2, minus the length of the stroke of the decelerator piston 93 required for decelerating the carriage in column 2.

The spacings of the decelerator stops 96 for the succeeding columnar positions of the carriage are similarly determined from the spacings of the corresponding column stops 61, the distances through which the piston 93 and stop shaft 94 will be retracted during tabulation of the paper carriage from each columnar position to the next, and the lengths of the compression strokes of the piston 93 required for the desired amount of deceleration of the carriage during the final portion of each of such tabulating movements.

The amount of deceleration required to be effected by the decelerator dashpot at the end of each tabulating movement will not be uniformly proportional to the lengths of the several tabulating movements of the paper carriage of machines which have various function control devices conditioned, as in the Burroughs "high keyboard" machines, by the carriage as the carriage enters its successive columnar positions. The actuation of such function control devices by the carriage during the final portions of its movements into certain columnar positions takes more or less energy from the moving carriage and so aids in decelerating the carriage to a greater or lesser extent during the final portions of its tabulating movements into successive columnar positions, depending upon the number and nature of the functions of the various function control devices which are thus conditioned by the carriage in each columnar position. In some columnar positions of the carriage, as in the column 4 position in the example illustrated in Fig. 4, none of the function control devices of the machine, excepting possibly only an easily conditioned register selecting means, such as disclosed in Pasinski Patent No. 1,911,768, need be actuated or conditioned by the carriage as the carriage enters such a columnar position, so that all, or substantially all, of the deceleration of the carriage required before the corresponding column stop 61 is arrested by the tabulating abutment 62 must be effected by the decelerating dashpot. In other columnar positions, as in columns 2 and 3 in Fig. 4, the carriage must condition certain function control devices such as a subtraction control means as well as the register selecting means, which, together, take a medium amount of energy from the carriage, whereas, in still other columnar positions, the carriage must condition, in addition to the register selecting means, other function control devices, such as an automatic total-taking control mechanism, the conditioning of which may take a considerable amount of energy from the carriage. In each column the decelerating stop 96 will be so positioned as to cause the dashpot to effect so much of the deceleration of the carriage as would otherwise cause undesirable shock and noise at the final arrest of the carriage in such columnar position.

It is believed that, from the foregoing, the operation of the carriage decelerating means during a program of carriage movements in which, as in line I of Fig. 4, the carriage will be arrested by each of its column stops 61 in all of the respective columnar positions of the carriage, will be entirely clear. The position of the decelerator piston 93 and stop shaft 94 as the carriage comes to rest in each of its successive columnar positions may vary from column to column. It will be apparent that, with suitable proportioning of the spring 114, the check valve 110, and the passage 112 in the piston 93 and with suitable adjustments of set screws such as 147 (Fig. 12) controlling vents 148 and 149 at opposite ends of the dashpot cylinder 90, in combination with appropriate positioning of the several decelerator stops 96 along the shaft 94, the piston 93 could be brought near to the end of its maximum compression stroke at the close of each carriage decelerating operation and the length of the decelerating stroke of the piston at the end of the next tabulating movement of the carriage would then be determined by the length of the restoring movement of the piston 93 during such tabulation and, therefore, by the length of such tabulating movement and, because of the substantially continuous acceleration of the carriage during the tabulating movement, thus, also, in accord with the velocity of the carriage when the next decelerator stop 96 comes into engagement with the decelerator abutment 100, except as the amount of carriage deceleration required to be effected by the decelerator dashpot would be varied by the decelerating effect on the carriage of the function control devices to be conditioned by the carriage in the different columnar positions. However, the characteristics of the spring 114, and of the piston check valve 110, and the adjustments of the vent-controlling set screws 147 and of the cushion stops may also be such that, as in the case of the example illustrated in Fig. 4, the piston 93 at the end of its decelerating stroke for one or more of the carriage positions may be nearer to the end of its return or retraction stroke than to the end of its maximum compression stroke.

In case the nature of the work to be performed on the machine is such that the carriage may be arrested in a given columnar position sometimes by normal tabulation from the immediately preceding columnar position and sometimes after skip tabulating through one or more preceding columnar positions with correspondingly different velocities, the characteristics of the spring 114, valve 110 and vent 112, and the adjustments of the vent control screws 147 and the positioning of the decelerator stops 96 on the shaft 94 should be such that, at the end of the decelerating stroke of the piston 93 when the carriage comes to rest in such given columnar position, the piston 93 and decelerator stop shaft 94 will be rather near the end of the full compression stroke of the piston and also in a similar position when the carriage is arrested in that one of the preceding columnar positions from which the longest skip-tabulating movement to the first-mentioned columnar position is to be made and/or progressively moved closer to such a position as and when the carriage is arrested in the intermediate columnar positions. Thus, the length of the decelerating stroke of the piston 92 and its decelerating effect on the carriage as the latter tabulates or skip-tabulates to a given columnar position will depend upon the length of the carriage movement and will, consequently, be appropriate to the velocity and momentum of the carriage as it arrives in such columnar position, as is illustrated in lines I, II and III of Fig. 4.

In line I of Fig. 4, the carriage enters its column 4 position by a normal tabulation from the column 3 position, and as this tabulating movement of the carriage is short, the length of the decelerating stroke of the piston 93 will provide only the relatively small amount of carriage deceleration required to cushion the arrest of the carriage at the end of such a short tabulation in which the carriage attains but little velocity and momentum. In the making of a subsequent line of entries, the skip tabulating control may be conditioned to cause the carriage to skip tabulate from its column 2 position to its column 4 position as in line II of Fig. 4, whereby the carriage enters its column 4 position by a longer skip-tabulating movement and with higher velocity and momentum. The decelerator stop 96 for the column 4 position will engage the abutment 100 when the tabulating stop 61 for the column 4 position is farther from the tabulating abutment 62 than at the time the decelerator stop 96 for column 4 engaged the abutment 100 in the normal tabulating movement of the carriage from column 3 to column 4 in line I. Consequently, the decelerating means will automatically effect a greater deceleration of the carriage at the end of the skip-tabulating movement from column 2 to column 4 in line II, and the final arrest of the carriage will be effected also without objectionable noise and shock. In line III, a longer skip-tabulation of the carriage from its column 1 position to its column 4 position is indicated. The decelerating stroke of the piston 93 during the final portion of its longer skip tabulating movement will be still greater and provide a greater decelerating effect than in the skip-tabulation of the carriage from column 2 to column 4 in line II, so that, as the carriage arrives in its column 4 position from its column 1 position in line III, the final arrest of the carriage will also be effected without undesirable noise and shock.

From the foregoing it will be apparent how the decelerating means of the form of the invention illustrated in Figs. 1 to 4 can be adjusted for a wide variety of programs of carriage tabulation and skip tabulation so as to eliminate undesirable noise and shock in the arrest of the carriage in each of its columnar positions after tabulating and skip-tabulating movements of varying lengths in which the carriage will acquire velocity and momentum which may vary over a wide range.

To eliminate any tendency of the dashpot to cause rebound of the carriage when the dashpot is rapidly compressed and a high air pressure is rapidly built up at the end of any carriage movement in which the carriage attains a high momentum, the piston rod 92 is formed with a groove 159 (Fig. 12) which is of such dimensions and so positioned on the rod 92 that when the piston is moved to substantially the end of its compression stroke, said groove releases such air pressure from the compression side of the piston to the atmosphere.

Modified embodiment

To take care of certain complications which may arise in special cases, there has been provided a modified embodiment of the invention which is illustrated in Figs. 5 to 17, where structural parts present also in the first described embodiment of Figs. 1–4 are designated by the same reference numerals as applied to them in Figs. 1–4, except that the reference numerals for some of said members which have been significantly modified for use in the modified embodiment of the invention have an $x$ added to them.

Some work forms cause special difficulties. For example, a form may have a very narrow column so that the spacing between the column stop for that narrow column and the column stop for the preceding column is very small, say, from ¾ of an inch to 1 inch, and the nature of the work may be such that the paper carriage will always arrive in the position corresponding to such narrow column always by a relatively long skip-tabulating movement, with the result that, because of the high velocity and momentum of the carriage as it arrives in such columnar position, a very large or perhaps the maximum decelerating stroke of the dashpot piston is required to permit the final arrest of the carriage to be effected without objectionable noise or shock. Thus, it may be necessary to position the decelerating stop for such narrow column ahead of the column stop for that column by a distance which exceeds the spacing between said column stop for said column and the column stop for the preceding column. The decelerator stop must, therefore, be permitted to engage the decelerator abutment before the column stop for the preceding column has passed the stop shoulder on the tabulating abutment. It will be seen that, under such circumstances, there would be difficulties in securing the desired result with the previously described embodiment of the invention.

Some machines are adapted to perform a plurality of varieties of work and to produce the records of such varieties of work on a like plurality of forms or sets of forms having different columnar arrangements suited to the natures of the entries to be recorded in performing the different kinds of work. Such machines are provided with column stops for all of the columnar positions in which the carriage is to be arrested for all of the different work forms or sets of forms, and such machines have been provided with means for readily setting the controls from time to time for different programs of carriage movements corresponding to the rulings on the different forms or sets of forms to be used at different times. Consequently, for one of the forms the carriage may be arrested in a columnar position after a long movement in which the carriage attains relatively high velocity and momentum, and the column stop for such columnar position may follow a column stop for a column on another one of the work forms at a distance smaller than the length of the decelerating stroke of the dashpot piston required for adequately decelerating the carriage at the end of such a long movement. With regard to obtaining satisfactory operation of the decelerating means, these circumstances present the same difficulty as in the case of the previously mentioned form having a narrow column, and in which case the carriage would arrive at the corresponding columnar position only after a relatively long movement. It is to be noted, however, that this difficulty will not always arise from the columnar arrangement on a single form, but may arise because of columnar arrangements on a plurality of forms which are to be used at different times in a machine having means for selecting different programs of carriage movements suited to the different forms.

Figure 6:
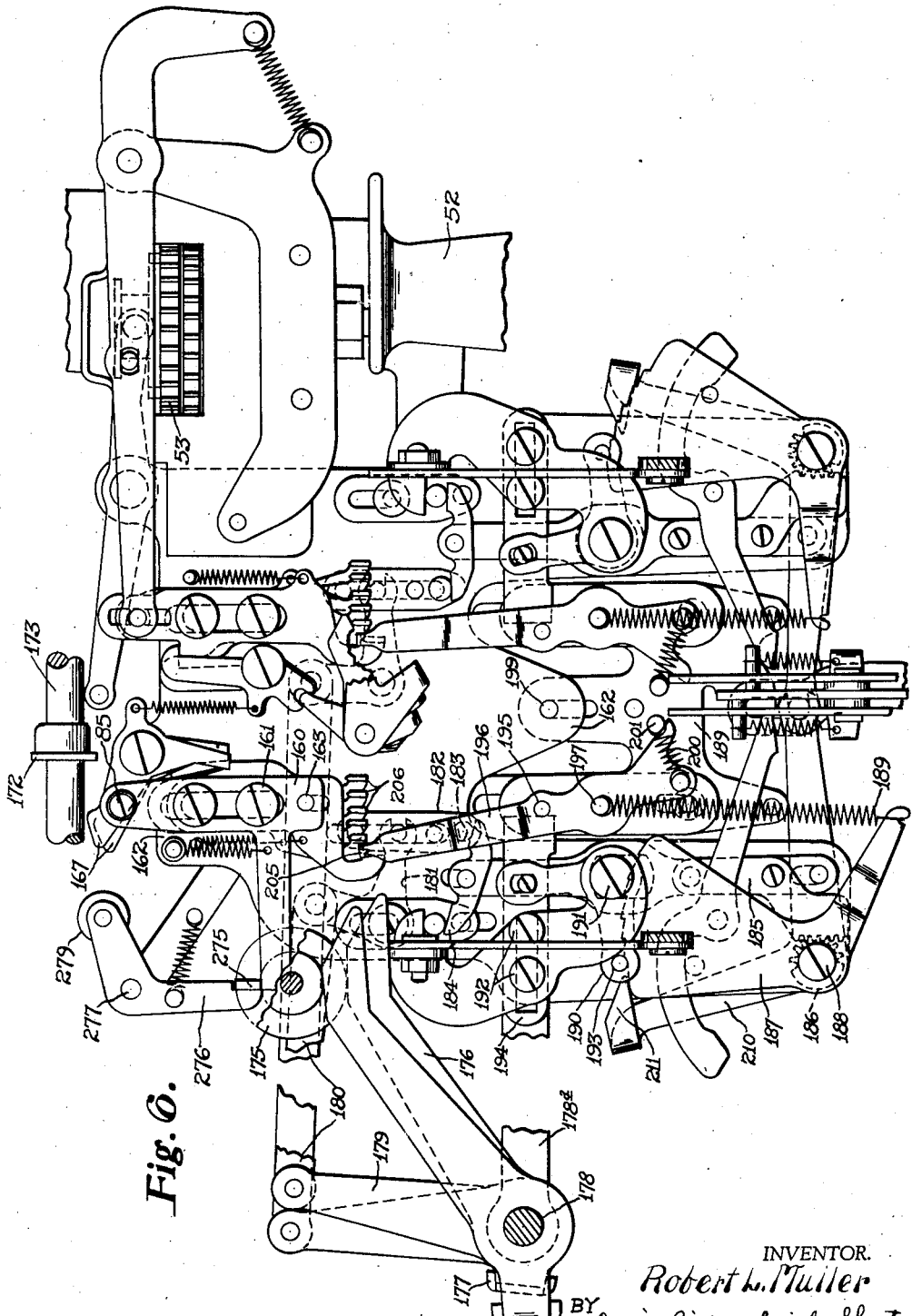
Fig. 6 is a front elevation of portions of the mechanism for controlling the carriage movements in the machine of Fig. 5, and showing portions of the modified embodiment of the invention.

The second form of the invention has been illustrated as applied to the Burroughs "high keyboard" machine provided with means of the kind disclosed in the copending application of Arthur J. Fettig, Serial No. 233,280, filed October 4, 1938, for providing an extremely flexibly and easily variable control of carriage tabulating, skip-tabulating and return movements, and comprising also means for readily changing over from each one to any other of a plurality of programs of such carriage movements. In such a machine, the ordinary tabulating movements of the carriage may sometimes be controlled in the usual manner, as already mentioned in connection with the description of the first form of the invention, but may also be controlled by the same variably settable means which controls the skip-tabulating movements of the carriage in such machine. In fact, it should be borne in mind that carriage movements which, by reference to merely the one form or set of forms in connection with which such carriage movements are used may, in fact, be skip-tabulating movements because of the presence of column tabulating stops which are required for other forms to be used in the machine but are not permitted to arrest the carriage when the mechanism is set for the program of carriage movements required by the first-mentioned form. Such movements must, of course, be controlled by the variably settable skip-tabulating control means of said Fettig machine. Such machine, as shown in Fig. 5, has the usual skip-tabulating control bail 82 mounted on the carriage with the arm 81 cooperating with the lever 80 to control the restoration of the column stop shaft 60 to permit arrest of the carriage by column stops 61 in the desired columnar positions. Said skip-tabulation control bail 82 is also in turn controlled by a roller stud 85 on the upper end of a slide 160 (Fig. 6). The slide 160 is vertically slidably guided on a pair of studs 161 secured in a supporting and mounting plate 162 which is secured to a portion of the housing 52 of the carriage return drive means. The slide 160 has, near its lower end, a stud 163 (Figs. 6 and 9) which passes through vertically elongated slots in each of a series of settable slides 165 (Fig. 9) guided for vertically sliding movement on the studs 161. When the slide 160 is in its normal elevated position where it holds the bail 82 elevated and the arm 81 out of contact with the lever 80, the stud 163 is positioned in the upper ends of the slots in the lower portions of the settable slides 165 so that, upon depression of any one of the slides 165, the depressed slide 165 will, through the stud 163, depress the slide 160 and roller 85 to permit the bail 82 to be moved by its spring to position the end of the arm 81 over the end of the lever 80 when the rear end of the latter is depressed by the rocking of the column stop shaft 60 to release the carriage for movement to a subsequent columnar position. Each settable slide 165 is urged upward by an individual spring 166 and for each settable slide 165 there is a latch member 167 which is pivoted on a stud 168 supported in the plate 162 and is urged by an individual spring 169 to position its lower latch arm above a shoulder 170 formed on the edge of the slide 165, whereby any settable slide, when set to its lower position, is latched in such set lower position and thus holds the slide 160 and roller 85 in the lower or skip-tabulating position until, during the ensuing movement of the carriage, the latch member 167 for the set and latched slide 165 is tripped by that one of a series of skip release discs 172, secured on a shaft 173 supported in the carriage frame, which is so formed as to cooperate with and release that particular latch 167 at the proper point in the movement of the carriage to permit the restoration of the set slide 165, the slide 160 and roller 85, the bail 82 and arms 81 and 80 to release the column stop shaft 60 for restoration in time to permit the desired column stop 61 to engage the tabulating abutment 62 to arrest the carriage in the desired columnar position.

The selection of the slide 165 to be set for each skip-tabulating movement of the carriage is controllable by control rolls 175 (Fig. 6) mounted on the paper carriage and is effected by means actuated by the machine during cycles of operation of said machine. The skip tabulating control rolls 175 mounted on the carriage in different positions lengthwise of the carriage corresponding to different columnar positions where skip-tabulating movements are to be initiated, cooperate with a control cam lever 176 forming one arm of a yoke 177 which is pivotally mounted on a shaft 178 fixed in an arm 178a fixed on the plate 162. The other arm 179 of the yoke 177 is connected through a link 180 to one arm of a bell crank 181 pivoted on the plate 162 and having its other arm slotted to engage a stud on a slide 182 guided for vertical movement on studs carried by the plate 162. The lower end of the slide 182 carries a stud 183 cooperating with one branch of a differential lever 184 pivoted intermediate its ends on the upper end of a rack 185 which, at its lower end, meshes with a pinion 186 secured to a stepped sector 187 rockably supported on a stud 188 secured in the plate 162. A spring 189 connected to an arm extending from the sector 187 urges the latter counterclockwise in Fig. 6. One arm of a bell crank 190, which is pivoted on a stud 191 carried on an arm fixed on studs 192 secured in the plate 162, carries a stud 193 adapted to cooperate with the stepped edge of the sector 187 and has its other arm connected through a stud and slot connection with a slide 194 guided for horizontal movement on the studs 192. The right end of the edge of the slide 194, as viewed from the front of the machine, engages a stud 195 on a lever 196 which is pivoted at 197 on a slide 198 which is guided for vertical movement on studs 199 secured in the plate 162. The lever 196 is yieldingly urged counterclockwise, as viewed in Fig. 6, by a spring 200 connected between a stud on the lower end of said lever and a stud 201 which is secured in the slide 198 and is engageable by a projection on the lever 196 to limit the counterclockwise movement of the latter.

The slide 198 is normally yieldingly held, by springs 202 (Fig. 7) connected between studs 203 on said slide and studs 204 on the plate 162, in its uppermost position where a rearwardly bent lug 205 on the lever 196 is positioned above the level of lateral lugs 206 formed on downward projections on the settable slides 165, so that the lever 196 may be rocked freely to position the lateral lug 205 at its upper end over the lateral lug 206 of any selected one of the slides 165.

A bell crank 210 (Fig. 6) pivoted on the stud 188 has a cam end 211 bent into position to cooperate with the stud 193 on the bell crank 190 and has on the end of its other arm a stud 212 engaging in a slot in the upper end of a vertical link 213 (Fig. 7) and connected to one end of a spring 214, the other end of which is connected to a stud on said link 213 by which, as will hereinafter be described, it is normally held with the cam end 211 of its upper arm in position to hold the stud 193 above and out of contact with the stepped edge of the sector 187, whereby the lever 196 is also held, through the bell crank 190 and slide 194, in a position where the lug 205 on its upper end is to the right of and out of register with the last lug 206 at the right end of the series of lugs 206.

When the paper carriage moves into a columnar position where a skip-tabulating operation is to be initiated, a skip control roll 175 of a selected size mounted on the paper carriage engages the cam lever 176 and rocks the yoke 177 clockwise in Fig. 6, and, through the previously described connections, also rocks the stepped sector 187 clockwise against the tension of its spring 189 to a position determined by the size of the roll 175. This places a selected step on the selector beneath the stud 193 so that, during the forward stroke of the subsequent cycle of operation of the machine, when the bell crank 210 is rocked counterclockwise by the raising of the link 213 as will be described further below, the spring 200 is permitted to rock the lever 196 counterclockwise, move the slide 194 to the left and rock the bell crank 190 counterclockwise until the stud 193 engages the selected step of the sector 187, which stops the lever 196 with the lateral lug 205 on its upper end above a lug 206 on the corresponding one of the settable slides 165. Later, at the beginning of the return stroke of the machine cycle, the slide 198 is lowered, pulling the lever 165 downwardly whereby the selected settable slide 165 is lowered and latched in set position by the corresponding latch 167. As already described, this frees the bail 82 and arm 81 so that, when the column stop shaft 60 is rocked to release the carriage for movement, the shaft 60 and column stops 61 will be held in rocked position until the carriage has moved to the desired point in its travel where a skip release disc 172 releases the latched slide 165 and permits the column stops 61 to return to effective position in time for the column stop 61 for the desired column to arrest the carriage.

The shaft 173 carrying the skip release discs 172 may be rotated by a hand lever 215 (Fig. 16) pivotally mounted on a bracket 216 secured to the carriage and connected, through a link 217, to a slide 218 guided for horizontal movement on the carriage and having an arm 219 carrying a stud 220 engaging in a helical groove in a cylinder 221 secured on the shaft 173. Also, the skip control members, instead of being formed as rolls 175, may be formed as members 222 having spaced lobes 223 of various lengths and connected to pinions 224 rotatable therewith on the control roll shafts 225 supported on the carriage. The pinions 224 mesh with a rack 226 having a slot in which is engaged a lateral projection 227 from the slide 218 whereby movement of the lever 215 will both change the selection, by the control members 222, of the settable skip control slides which are to be set in the several columnar positions of the carriage, and vary the order of release of the set and latched slides 165 by the release discs 172 at different points in the carriage travel whereby the control mechanism briefly described above may be set for a plurality of programs of carriage movements corresponding to a plurality of different work forms or sets of work forms and may be readily conditioned by the operator for any of such preset programs at any time.

A disclosure of further details of the mechanism controlling the program or programs of carriage movements will be found in the above-mentioned Fettig application, Serial No. 233,280.

In this modified form of the invention the release of the decelerator stops 96 from the abutment 100x is effected somewhat differently than the manner in which it is effected in the first-described embodiment of the invention. Instead of releasing the engaged decelerator stop 96 simultaneously with the release of the active column stop 61 from the tabulating abutment 62, the engaged decelerator stop 96 is disengaged from the decelerator abutment 100x at the very beginning of each machine cycle to permit the stop shaft 94 and the decelerator piston 93 to restore to substantially the fully retracted position before the carriage tabulates to the succeeding columnar position. Thus, the degree of deceleration of cushioning of the carriage to be effected by the decelerating device at the end of each tabulating or skip-tabulating movement of the carriage will be determined substantially wholly by the extent to which the decelerator stop for each column is positioned on the stop shaft 94 in advance of the column stop 61 for the corresponding column while the stop shaft 92 and piston 93 are in their fully retracted positions.

Accordingly, the link 102x of Figs. 5 and 13 has a slotted engagement with the stud 101 on the lever 71, 73, such that it is not pulled forwardly and does not rock the shaft 94 when the column stop shaft 60 is rocked by the tabulating pawl 71 for automatic tabulation or skip-tabulation of the carriage but can rock the shaft 94 to raise the decelerator stops 96 above the abutment 100x when the lever 73 is manually operated to tabulate the carriage. A spring 230 connected between a stud on the plate 103 and a lug extending laterally from the carriage end plate urges the link 102x rearwardly and the shaft 94 clockwise to hold the decelerator stops in effective position relative to the abutment 100x.

On the front face of the decelerator abutment slide 100x near the lower end of the latter, there is secured a stud 235 (Figs. 7 and 8) adapted to be engaged by the lower cam edge of a lever 236 pivoted on a stud 237 secured in the plate 99x. The lever 236 also carries a stud 238 which engages in a slot in the upper end of a vertical link 239 pivotally connected at its lower end to the rear end of a lever 240 (Fig. 15) to which the link 213 controlling the bell crank 210 is also connected. In a manner to be described hereinafter, the rear end of the lever 240 is lowered at the beginning of the forward stroke of the machine cycle, which tensions the spring 214 without moving the bell crank 210 and momentarily lowers the link 239 which, through the lever 236 and stud 235, lowers the abutment slide 100x to disengage it from the engaged decelerator stop 96, whereupon the decelerator stop shaft 94 and piston 93 are permitted to be moved toward their fully retracted position by the spring 114.

The abutment slide 100x is permitted to be returned upwardly to normal position by its spring 98 as soon as the link 239 is restored to its normal position. However, if the skip-tabulation control means is to be set for a skip-tabulating movement, the abutment slide must again be depressed before the carriage is released for movement and must be held in its lowered position until it has been passed by the decelerating stop or stops 96 corresponding to the column stop or stops 61 to be skipped. Means has, therefore, been provided which is conditioned to move the abutment slide 100x to and latch it in its lowered position out of the path of the decelerating stops whenever any of the skip tabulation control slides 165 is set to cause a skip-tabulating movement of the carriage. This means comprises a cam member 245 (Figs. 7 and 8) pivotally mounted on the lower one of the studs 246 on which the decelerator abutment slide 100x is guided and having an arm connected with one end of a spring 248 which is connected at its other end to a stud on the plate 99x and urges said cam member 245 clockwise as viewed from the back of the machine as in Fig. 7. The cam member 245 has a depending cam arm 249 to cooperate with a stud 250 on the rear side of the lower end of the decelerator abutment slide 100x and is normally held in the counterclockwise position of Fig. 7 by a latch member 251 which is pivotally mounted on a stud 252 secured in the plate 99x and having a shoulder normally engaged under a lateral lug 253 on a third arm of the cam member 245.

A spring 255 connected with a second arm of the latch member 251 normally holds the latter in latching engagement with the lug 253 on the cam member 245. The other end of the spring 255 is connected to an arm of another latch member 256 having a second arm formed with a latching shoulder adapted to cooperate with a shoulder 257 formed on the abutment slide 100x. A stud 258 positioned in the space above the lateral arm of the latch member 251 and below the lateral arm of the latch member 256 is carried on one end of a lever 259 pivoted on a stud 260 secured in the plate 99x and urged clockwise by a spring 261. The other arm of said lever 259 is slotted to receive one end of a lever 262 (Figs. 9, 10 and 11) pivoted on a stud 263 secured in a bracket 264 (Fig. 12) secured to the plate 162. The other end of said lever 262 is slotted to receive the end of a lever 265 pivoted on a stud 266 (Fig. 11) secured in the skip control mounting plate 162. The lever 265 carries a stud 267 extending along the side edges of all of the skip-tabulation control slides 165 below the latching shoulders 170 thereon so that, upon depression of any of the settable skip control slides 165, the end of the lever 265 is depressed and the stud 258 is depressed to trip the latch member 251, which releases the cam member 245 for clockwise movement by its spring 248 to depress the decelerator abutment slide 100x. Simultaneously, the depression of the stud 253 permits the latch member 256 to rock clockwise to latch the decelerator abutment slide 100x in its lowered position.

From the foregoing, it will be apparent that whenever a skip tabulation control slide 165 is set in its depressed position, the decelerator abutment slide 100x will also be depressed and will be held latched in its depressed position as long as said skip tabulation control slide 165 remains in its set depressed position. When the depressed skip tabulation control slide 165 is released by the tripping of its latch 167 by a skip release disc 172, in the course of the movement of the carriage, and is restored to its normal elevated position by its spring 169, the spring 261 will effect restoration of the levers 259, 262 and 265 to their normal positions and the raising of the stud 258 will rock the latch member 256 counterclockwise to release the decelerator abutment slide 100x for restoration to its normal elevated effective position by its spring 98. The raising of the stud 258 will also free the latch member 251 to relatch the cam member 245 in the position of Fig. 7 when a stud 270 on the lever 236 rocks said cam member 245 back to its normal position of Fig. 7 as the link 239 is pulled down at the beginning of the next machine cycle.

By the above-described means, the decelerator abutment slide 100x will be depressed and held in its depressed position during a portion of the carriage tabulating movement until after the decelerator stop 96 for the last of the columnar positions to be skipped has passed over said abutment slide 100x, which then will be released and restored to its effective position in time to engage the decelerator stop 96 for the columnar position in which the carriage is to be arrested. It has been pointed out above that, when the last column being skipped is a very narrow column and the skip-tabulating movement of the carriage is a long one, the column stop 61 for the columnar position preceding the columnar position in which the carriage is to be arrested may not pass the shoulder 63 on the tabulating abutment 62 until somewhat after the decelerator stop 96 for the columnar position in which the carriage is to be arrested has reached the decelerator abutment 100x. It is, therefore, necessary to provide additional means to hold the column stop shaft 60 in its rocked position with the forward ends of the column stops 61 elevated for a longer time until the column stop 61 for the last of the columns to be skipped has passed the shoulder 63 of the tabulating abutment. For this purpose, the slide 160, which is depressed by the settable slides 165 when the latter are depressed and which carries the roller 85 controlling the skip-tabulator control bail 82, is provided with a lateral arm 275 (Figs. 7, 9 and 10) extending, as viewed from the back of the machine, from the right side of said slide 160. The end of said arm 275 is bent rearwardly and formed with an upwardly turned shoulder to cooperate with a latch shoulder on the depending arm of a bell crank latch member 276 pivoted on a stud 277 secured in the bracket 264 and urged clockwise, as viewed in Figs. 7 and 9, by a spring 278. At the end of its leftwardly extending horizontal arm, the bell crank 276 carries a roller 279 which is adapted to be engaged and depressed by the skip release disc 172 after the carriage has traveled a short distance further after the skip release disc has passed over the latch members 167.

While each skip release disc 172 passing over the roller 279 will trip the bell crank latch 276, this will be without effect as long as the depressed skip control slide 165 remains latched in its depressed position, because the spring 278 will immediately return the latch shoulder of the bell crank latch 276 into latching position above the end of the arm 275 on the slide 160. However, the first skip release disc 172 acting upon the roller 279 after the last set skip control slide 165 has been unlatched will permit the slide 160 to restore immediately to its elevated position to rock the skip control bail 82 to release the column stop shaft 60 for return to normal to place the appropriate column stop 61 in position to engage the tabulating abutment 62. When the slide 160 is held depressed by a skip control slide 165 latched in its set position, there is a small clearance between the lower edge of the latch shoulder on the bell crank latch member 276 and the upper edge of the shoulder on the lateral arm 275 of the slide 160 so that, when the latch for the set skip control slide 165 is released by a skip release disc 172, the slides 165 and 160 are both permitted to be moved upwardly slightly by the spring 169 of the skip control slide to prevent the latch 167 for said skip control slide 165 from relatching it.

Because of the additions and modifications made in the skip-tabulating control means to effect the desired coordinated control of the decelerator stops and column stops, it has been necessary to modify the power-driven means which actuates said skip-tabulating control means. It has already been mentioned that the lever 240 (Fig. 15) actuates and controls the link 239 as well as the cam lever 210. The lever 285 actuates the slide 198. These levers 240 and 285 are pivoted on a stud 286 secured in a portion of the drive housing secured beneath the main frame of the machine and are urged clockwise in Fig. 15 by springs 287 and 288, respectively. The lever 240 has a depending arm 290 formed at its end with a lateral lug normally engaged by the forward one of two latch shoulders on a latch lever 291 pivotally supported on the crank shaft 34 and urged clockwise to the latching position of Fig. 15 by a spring 292. The arm 290 also carries a stud 293 adapted to cooperate with the end of a lever 295 pivoted on a fixed stud 296 and carrying at its opposite end a stud 297 cooperating with a cam 298 secured on the crank shaft 34.

The parts are so arranged that, at the beginning of the machine cycle during the initial portion of the revolution of the crank shaft 34, the cam 298 rocks the arm 295, which in turn acts on the stud 293 to rock the lever 240 counterclockwise. The lever 240 thus pulls down the link 239 which rocks the lever 236 to depress the decelerator abutment slide 100x and simultaneously restore the cam member 245 to its normal latched position of Fig. 7. This downward movement of the lever 240, because of the pin-and-slot connection between the link 213 and the cam lever 210, is without effect on the latter but merely tensions the spring 214. At an early point in the forward stroke of the machine cycle, the cam 298 permits the lever 240, the link 239 and the abutment slide 100x to restore to their normal positions.

A lever 300 also pivoted on the stud 286 is formed at its upper end with a slot receiving a stud 301 on an arm 302 which is secured to the shaft 38 and through which the calculating and other mechanisms of the machine are driven. The lower end of the lever 300 is also slotted at its lower end to receive a stud 303 on one arm of a lever 305 pivoted on a fixed stud 306. The lever 305 is secured to a second lever 307 pivoted on said fixed stud 306 and having a rearward projection 308 adapted to cooperate with a stud 309 on an arm of the latch lever 291. Consequently, the counterclockwise rocking of the shaft 38 and arm 302 during the forward stroke of the cycle of operation of the machine causes the levers 305 and 307 to be rocked clockwise, whereby the latch lever 291 is rocked to depress its forward latch shoulder below the lateral lug on the lever 290. The spring 287 is thereby permitted to elevate the rear end of the lever 240, which thus rocks the cam lever 210 counterclockwise to permit the stud 193 to move into engagement with the stepped edge of the sector 187, as in Fig. 6. Upward movement of the link 239, as the rear end of the lever 240 is elevated, is permitted by the stud and slot connection between the link 239 and the lever 236. This upward movement of the rear end of the lever 240 follows very quickly after the downward movement of the rear end of said lever 240 and at a relatively early point in the forward stroke of the machine cycle.

The lever 307 carries a pivoted pawl 310 normally held in the position of Fig. 15 by a spring 311 and adapted to cooperate with a stud 312 on the forward end of the lever 285. The pawl 310 has a shoulder which, at substantially the very beginning of the clockwise return stroke of the shaft 38 and arm 302, engages the stud 312 on the lever 285 and rocks said lever counterclockwise in Fig. 15 to pull down the slide 198, whereby the lever 196 is pulled downwardly and, if the lug 205 on the upper end thereof has been positioned over a lateral lug 206 on one of the skip control slides 165, will set said skip control slide. This occurs before the release of the engaged column stop 61 from the tabulating abutment 62 and, therefore, before the commencement of the tabulating movement of the carriage so that, if a skip control slide 165 is set to condition the mechanism for a skip-tabulating movement of the carriage, the latch 251 will be tripped by the means previously described upon the setting of said skip control slide 165, to permit the cam member 245 to depress the decelerating abutment 100x, which will thereupon be latched in depressed position by the latch 256, as already described. The release of the engaged column stop 61 from the tabulating abutment 62 occurs very quickly thereafter. Also quickly thereafter during the continuation of the return stroke of the machine cycle, the further return movement of the lever 307 carries the pawl 310 out of engagement with the stud 312 whereby the lever 285 and the slide 198 are permitted to return to normal.

The lever 307 also carries a second pawl 315 normally held in the position of Fig. 15 by a spring 316 and having a shoulder which, prior to the end of the return stroke of the machine cycle, engages a stud 317 on a forwardly extending third arm of a lever 240 and returns said lever 240 to its normal position of Fig. 15, where it is relatched by engagement of the forward shoulder of the latch lever 291 behind the lateral lug on the depending arm 290 of said lever.

It is believed that the sequence of operation of the various parts of the mechanism above described will be clear from the foregoing. It is believed that it will also be clear from the foregoing that the above-described mechanism will not only effect the required deceleration of the carriage during the latter part of each tabulating movement thereof to permit the carriage to be arrested without undesirable shock and noise in each of its various columnar positions, regardless of the length of the movement of the carriage and regardless of the velocity and momentum reached by the carriage in the latter part of such movement, but will also insure that, regardless of the spacing of the column stops and the thereby necessitated spacing of the decelerating stops, no incorrect operation will result from interference of a decelerating stop for any carriage position with movement of the carriage through said columnar position when it is not desired to arrest the carriage in the latter columnar position.

Fig. 17 illustrates, by way of example, a simple setup of the skip-tabulating and decelerating controls required for one example of work, for which the carriage must have two closely adjacent columnar positions (3 and 4) following long carriage movements. Whereas the columnar form rulings for both the column 3 and column 4 positions of the carriage indicated in Fig. 17 have been shown on a single work form, it is to be understood that the form ruling for the column 4 position of the carriage may be, but is not necessarily, on a work form other than that upon which the ruling for the column 3 position of the carriage appears. In either case, the mechanism controlling the programs of carriage movement is set up for two programs of carriage movement, in one of which the carriage is to be stopped in the column 3 position, whereas, in the other, the carriage is to be stopped in the column 4 position without stopping in the column 3 position. A skip control member 222 is arranged on the carriage so that when the machine is operated with the carriage in the column 2 position with the program shifting lever 215 in one position, no skip control slide 165 will be set. The carriage will, therefore, be arrested in its column 3 position as in the first line of Fig. 17. With the program shift lever 215 in the same position, and when the machine is operated with the carriage in the column 3 position, another skip control member 222 will condition the mechanism for the setting of a skip control slide 165 to cause the carriage to skip the column 4 position. When the program shift lever 215 is moved to a second position, the skip setting control members 222 and the skip release discs 172 are rotated, in the manner previously described, to the positions indicated at the bottom of Fig. 17, where it will be seen that the skip setting control member 222 in the column 2 position will now cause a skip control slide 165 to be set for a skip tabulation of the carriage from the column 2 position to the column 4 position, as in the second line of Fig. 7. When the carriage has moved sufficiently to carry the decelerator stop 96 for the column 3 position of the carriage past the decelerator abutment 100x, a skip release disc 172 will unlatch the set skip control slide 165 to permit the decelerator abutment 100x to return to its effective position in time to engage the column 4 decelerator stop 96. However, the latch 276 will still hold the skip control slide 160 in its lower position so that the column stop shaft 60 will remain in its rocked position while the carriage moves a short distance further, whereupon the skip release disc 172 will engage the roller 279 to release the skip control slide 160 in time to permit the column stop 61 for column 4 to engage the tabulating abutment slide 62. The carriage is thus stopped in the column 4 position after being properly decelerated to permit it to be arrested without undesired noise and shock.

While the two forms of construction above described are admirably suited for accomplishing the objects of the invention, it will be apparent that the invention may be embodied in various other structural forms and applied to various styles and makes of machines other than the Burroughs "high keyboard" machines to which the invention has been applied, as described above by way of examples. It will be apparent that the air-cushion dashpot which has been shown in both embodiments of the invention described above may be replaced by various other suitable forms of decelerating means.

I claim:

1. A machine of the class specified having relatively movable parts consisting of a stationary supporting portion and a carriage mounted for travel on said supporting portion, means to move said carriage to a plurality of predetermined positions relative to said supporting portion, two decelerator members capable of resisted relative movement, one of said decelerator members being fixedly connected with one of said relatively movable parts, means to couple the other of said decelerator members to the other of said relatively movable parts during movement of said carriage to cause said moving carriage to effect said resisted relative movement of said decelerator members to thereby decelerate said carriage, said coupling means including portions individually adjustable to cause said coupling to be effected upon arrival of said carriage at points which are spaced ahead of each of the respective ones of said predetermined positions to which said carriage is to be moved in accordance with the momentum normally acquired by said carriage in movement from the immediately preceding one of said predetermined positions, means to cause said carriage to skip through at least one of said predetermined positions, and means effective during movement of said carriage to condition said coupling means to effect said coupling upon arrival of said carriage at a point farther in advance of the next following one of said predetermined positions after skipping through the preceding one of said predetermined positions than when moving to said following predetermined position only from said preceding one of said predetermined positions.

2. A machine of the class specified having relatively movable parts consisting of a stationary supporting portion and a carriage mounted for travel on said supporting portion, means to move said carriage to a plurality of predetermined positions relative to said supporting portion, and means to decelerate said carriage as it approaches said predetermined positions, said latter means comprising two relatively movable stop means, one of which is connected with one of said relatively movable parts, a decelerating device including two relatively movable members one of which is connected to the other of said relatively movable parts and the other of which is connected to and movable with the other of said stop means, one of said stop means comprising a series of stop members individually adjustably secured on a common support and each engageable with a portion of said other stop means as said carriage approaches a respective one of said predetermined positions to cause relative movement of said relatively movable members of said decelerating device, and means to vary the position of one of said stop means during movements of said carriage to vary the points of engagement of the stop members of said series with the other of said stop means in said movements of said carriage to the respective ones of said predetermined positions in accordance with the momentum acquired by the carriage in such movements.

3. A machine of the class specified having relatively movable parts consisting of a stationary supporting portion and a carriage mounted for travel on said stationary portion to a plurality of predetermined positions relative thereto, and means to check the momentum of said carriage as it approaches one of said predetermined positions, said latter means comprising a decelerating device with two members capable of a resisted relative motion and one of which is connected to one of said relatively movable parts, a pair of relatively movable stop members one of which is connected to the other of said relatively movable parts and the other of which is adjustably connected to the other of said decelerating members to cause said resisted relative motion of said decelerating members upon mutual engagement of said stop members during travel of said carriage, said stop members having predetermined positions relative to said relatively movable parts while said carriage is at rest in a predetermined position preceding said one of said predetermined positions, and means for advancing one of said members toward the other of said members and relative to that one of said relatively movable parts with which it is connected prior to arrival of said carriage at said first-mentioned one of said predetermined positions and to an extent in accordance with the momentum with which said carriage would otherwise arrive at said latter predetermined position.

4. A machine of the class specified having driving means for driving said machine through cycles of operation, an element moved by said driving means in machine cycles, two relatively movable parts consisting of a stationary supporting portion and a carriage mounted for travel on said stationary portion to a plurality of predetermined positions relative thereto, and means to decelerate said carriage as it approaches one of said predetermined positions, said latter means comprising a decelerating device with two members capable of a resisted relative motion and one of which is connected to one of said relatively movable parts, a pair of relatively movable stop members one of which is connected to the other of said relatively movable parts and the other of which is connected to the other of said decelerating members to cause said resisted relative motion of said decelerating members upon mutual engagement of said stop members during travel of said carriage, said stop members having predetermined positions relative to said relatively movable parts while said carriage is at rest in a predetermined position preceding said one of said predetermined positions, means operated by said moved element in machine cycles to disengage said engaged stop members, and means rendered effective by said disengagement of said stop members to advance one of said stop members toward the other of said stop members during movement of said carriage and relative to that one of said relatively movable parts with which it is connected to a position to cause engagement of said stop members when said carriage arrives at a position in advance of said first-mentioned one of said predetermined positions to an extent in accordance with the momentum with which said carriage would otherwise arrive at said latter predetermined position.

5. A machine of the class specified having relatively movable parts consisting of a stationary supporting part and a carriage mounted for travel on said supporting part, means to move said carriage to each of a plurality of predetermined positions relative to said supporting part, and means to decelerate said carriage as it approaches said predetermined positions, said latter means comprising two relatively movable mutually engageable and disengageable stop means one of which is connected with said supporting part and the other of which is connected and movable with said traveling carriage, one of said stop means including an individually adjustable abutment element for each of a plurality of said predetermined carriage positions engageable with a portion of the other of said stop means upon approach of said carriage to the respective one of said predetermined carriage positions, a decelerating device interposed in the connection between one of said stop means and that one of said relatively movable parts with which that stop means is connected and including two members capable of resisted relative movement, one of which is connected with the last-mentioned one of said stop means and the other of which is connected with the last-mentioned one of said relatively movable parts, said last-mentioned one of said stop means being movable relative to said last-mentioned one of said relatively movable parts to cause such relative movement of said decelerator members upon mutual engagement of said stop means during approach of said carriage to said predetermined positions, said last-mentioned stop means being also thereby placed and held in a predetermined position as said carriage arrives in one of said predetermined positions, means to release said carriage for movement to a subsequent one of said predetermined positions and to disengage said engaged stop means, and means rendered effective by disengagement of said stop means to shift said last-mentioned one of said stop means counter to said last-mentioned movement thereof during movement of said carriage and from said predetermined position thereof to position it for engagement with the other of said stop means upon said carriage reaching a point spaced ahead of said subsequent one of said predetermined carriage positions to an extent in accordance with the momentum with which said carriage would otherwise arrive at said subsequent predetermined position.

6. A machine of the class specified having relatively movable parts consisting of a stationary supporting portion and a carriage mounted for travel on said stationary portion, means to move said carriage on said stationary portion, means to arrest said carriage at each of a plurality of predetermined positions on said stationary portion, said arresting means comprising an abutment member on one of said relatively movable parts and a plurality of stop members on the other of said relatively movable parts and adapted to engage said abutment member as said carriage arrives at respective ones of said predetermined positions, and means to decelerate said carriage as it approaches said predetermined positions, said latter means comprising two relatively movable stop means, one of which is connected with one of said relatively movable parts, a decelerating device including two relatively movable members one of which is connected to the other of said relatively movable parts and the other of which is connected to and movable with the other of said stop means, one of said stop means comprising a series of stop members each engageable with a portion of said other stop means as said carriage approaches a respective one of said predetermined positions to cause relative movement of said relatively movable members of said decelerating device, means to vary the position of one of said stop means to cause the stop members of said series comprised in one of said stop means to engage said other stop means as said carriage arrives at points which are spaced ahead of the respective ones of said predetermined positions in accordance with the momentum with which the carriage would otherwise arrive at each of said predetermined positions, and means operable when said carriage is at rest in one of said predetermined positions to disengage the engaged arresting stop member from said abutment member and the engaged decelerator stop member of said series from the other decelerator stop means to release said carriage for movement by said moving means to a subsequent one of said predetermined positions.

7. A machine of the class specified having relatively movable parts consisting of a stationary supporting portion and a carriage mounted for travel on said supporting portion, means to move said carriage, means to arrest said carriage in each of a plurality of predetermined positions relative to said supporting portion, said arresting means comprising a stop member for each of said carriage positions and an abutment member adapted to engage each of said stop members upon arrival of said carriage at the respective position, two decelerator members capable of resisted relative movement and one of which is connected to one of said relatively movable parts, means to couple the other of said decelerator members to the other of said relatively movable parts in the final portions of the movements of said carriage to each of said predetermined positions whereby said carriage is decelerated in causing said resisted relative movement of said decelerator members, means to disengage said arresting means and coupling means while said carriage is at rest in one of said predetermined positions to permit said moving means to move said carriage to a subsequent one of said predetermined positions, means to retain said arresting means and coupling means in disengaged condition during passage of said carriage through intermediate ones of said predetermined positions, means to condition said coupling means to effect said coupling when said carriage arrives at a point which is spaced ahead of said subsequent predetermined position in accordance with the momentum of said carriage in its movement to said predetermined position, means to disable said disengaging means prior to arrival of said carriage at said point ahead of said predetermined position, and additional means to retain said arresting means in disengaged condition and controlled by said disabling means to be disabled after passage of the arresting stop member for the last of said intermediate positions relative to said abutment member and prior to passage of the arresting stop member for said subsequent predetermined position relative to said abutment member.

8. A machine of the class specified having relatively movable parts consisting of a stationary supporting portion and a carriage mounted for travel on said supporting portion, means to move said carriage in one direction, means to arrest said carriage in its movement in said direction in each of a plurality of predetermined positions relative to said supporting portion, two decelerator members capable of resisted relative movement and one of which is connected to and movable with said carriage, means to couple the other of said decelerator members to said stationary supporting portion in the final portions of the movements of said carriage to each of said predetermined positions whereby said carriage is decelerated in causing said resisted relative movement of said decelerator members, means to condition said coupling means to effect said coupling when said carriage arrives at points which are spaced ahead of each of said predetermined positions in accordance with the momentum of said carriage in its movements to each of said predetermined positions, means to return said carriage in the opposite direction, and means to connect said carriage return means to the last-mentioned decelerator member to smoothly accelerate said carriage at the start of its return movement.

9. A machine of the class specified having relatively movable parts consisting of a stationary supporting portion and a carriage mounted for travel on said supporting portion, means to move said carriage in one direction, means to arrest said carriage in its movement in said direction in each of a plurality of predetermined positions relative to said supporting portion, two decelerator members capable of resisted relative movement and one of which is connected to and movable with said carriage, means to couple the other of said decelerator members to said stationary supporting portion in the final portions of the movements of said carriage to each of said predetermined positions whereby said carriage is decelerated in causing said resisted relative movement of said decelerator members, means to condition said coupling means to effect said coupling when said carriage arrives at points which are spaced ahead of each of said predetermined positions in accordance with the momentum of said carriage in its movements to each of said predetermined positions, means to return said carriage in the opposite direction and comprising a drive means and a driven member, a connection between said driven member and said carriage to permit relative movement between said driven member and carriage, and means to connect said driven member to the last-mentioned decelerator member to decelerate said relative movement between said carriage and driven member and smoothly accelerate said carriage at the start of its return movement.

10. A machine of the class specified having relatively movable parts consisting of a stationary supporting portion and a carriage mounted for travel on said supporting portion, a line-spaceable platen on said carriage, means to move said carriage in one direction, means to arrest said carriage in its movement in said direction in each of a plurality of predetermined positions relative to said supporting portion, two decelerator members capable of resisted relative movement and one of which is connected to and movable with said carriage, means to couple the other of said decelerator members to said stationary supporting portion in the final portions of the movements of said carriage to each of said predetermined positions whereby said carriage is decelerated in causing said resisted relative movement of said decelerator members, means to condition said coupling means to effect said coupling when said carriage arrives at points which are spaced ahead of each of said predetermined positions in accordance with the momentum of said carriage in its movements to each of said predetermined positions, means to return said carriage in the opposite direction and comprising a drive means and a driven member, a connection between said driven member and said carriage to permit relative movement between said driven member and carriage, platen line-spacing means on said carriage and actuated by said driven member in its movement relative to said carriage by said drive means, and means to connect said driven member to the last-mentioned decelerator member to decelerate said relative movement between said carriage and driven member to smoothly accelerate said carriage at the start of its return movement and avoid overspacing of said platen by said line-spacing means.

11. A machine of the class specified having a traveling carriage, carriage moving means, normally disconnected means to connect said moving means to said carriage to move the latter, said connecting means including a part movable by said moving means relative to said carriage and into connecting relation to a second part of said connecting means also movable relative to said carriage, and damped decelerating means having parts capable of a resisted relative movement and connected to said carriage and said second part of said connecting means respectively to decelerate relative movement between said carriage and said parts of said connecting means to thereby smoothly accelerate initial movement of said carriage by said carriage moving means.

12. A machine of the class specified having a traveling carriage, a line-spaceable platen on said carriage, carriage moving means, means to connect said moving means to said carriage to move the latter, said connecting means including a part movable relative to said carriage by said moving means, a platen line-spacing means, means connecting said relatively movable part to said line-spacing means to actuate the latter upon movement of said relatively movable part relative to said carriage by said carriage moving means, and a decelerating means connected between said carriage and said relatively movable connecting part to decelerate the movement thereof relative to said carriage upon operation of said carriage moving means to smoothly accelerate the initial portion of the movement of said carriage without overspacing of said platen by said line-spacing means.

ROBERT L. MULLER.